(12) United States Patent
Hagita et al.

(10) Patent No.: US 12,044,184 B2
(45) Date of Patent: Jul. 23, 2024

(54) GAS TURBINE EQUIPMENT WITH COMPRESSOR AIRFLOW CONTROL RESPONSIVE TO NOx CONCENTRATION AND CONTROL METHOD THEREOF

(71) Applicant: MITSUBISHI HEAVY INDUSTRIES, LTD., Tokyo (JP)

(72) Inventors: Tatsuya Hagita, Yokohama (JP); Akinori Hayashi, Yokohama (JP); Hiroyuki Takeishi, Tokyo (JP); Yoshitaka Hirata, Yokohama (JP); Keisuke Miura, Tokyo (JP); Keita Yunoki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/270,634

(22) PCT Filed: Feb. 3, 2022

(86) PCT No.: PCT/JP2022/004264
§ 371 (c)(1),
(2) Date: Jun. 30, 2023

(87) PCT Pub. No.: WO2022/172853
PCT Pub. Date: Aug. 18, 2022

(65) Prior Publication Data
US 2024/0068416 A1 Feb. 29, 2024

(30) Foreign Application Priority Data

Feb. 15, 2021 (JP) ................................. 2021-021754

(51) Int. Cl.
*F02C 9/50* (2006.01)
*F02C 3/22* (2006.01)
(Continued)

(52) U.S. Cl.
CPC ................... *F02C 9/50* (2013.01); *F02C 3/22* (2013.01); *F02C 3/30* (2013.01); *F02C 9/16* (2013.01);
(Continued)

(58) Field of Classification Search
CPC ...... F02C 9/16; F02C 9/18; F02C 9/20; F02C 9/28; F02C 9/50; F02C 9/52; F02C 9/54;
(Continued)

(56) References Cited

U.S. PATENT DOCUMENTS

| 6,742,341 | B2 * | 6/2004 | Ryan | ........................ | F02C 9/28 |
| | | | | | 60/725 |
| 6,877,307 | B2 * | 4/2005 | Ryan | ........................ | F02C 9/28 |
| | | | | | 60/39.281 |

(Continued)

FOREIGN PATENT DOCUMENTS

| EP | 3447379 A1 * | 2/2019 | ................ F02C 9/18 |
| EP | 3 604 929 | 2/2020 | |

(Continued)

OTHER PUBLICATIONS

International Search Report issued Apr. 5, 2022 in corresponding International Application No. PCT/JP2022/004264 with English Translation.

(Continued)

*Primary Examiner* — Alain Chau
(74) *Attorney, Agent, or Firm* — Wenderoth, Lind & Ponack, L.L.P.

(57) ABSTRACT

This gas turbine equipment comprises a gas turbine and a control device. A combustor of the gas turbine uses ammonia as fuel, and uses the RQL method. A compressor of the gas turbine includes an intake adjustor that adjusts an intake rate which is the flow rate of air that flows into a compressor casing. When the concentration of NOx in exhaust gas (Continued)

reaches or exceeds a predetermined value, the control device controls the operation of the intake adjustor so that the intake rate decreases.

16 Claims, 19 Drawing Sheets

(51) Int. Cl.
  *F02C 3/30* (2006.01)
  *F02C 9/16* (2006.01)
(52) U.S. Cl.
  CPC .... *F05D 2240/35* (2013.01); *F05D 2270/082* (2013.01); *F05D 2270/0831* (2013.01)
(58) Field of Classification Search
  CPC .... F23R 3/26; F23R 3/326; F23N 1/02; F05D 2270/082
  See application file for complete search history.

(56) References Cited

U.S. PATENT DOCUMENTS

| | | | |
|---|---|---|---|
| 7,024,862 B2* | 4/2006 | Miyake | F23N 5/203 60/773 |
| 9,599,017 B2* | 3/2017 | Joshi | F02C 3/34 |
| 10,422,287 B2* | 9/2019 | Jaiven | F02C 9/28 |
| 11,300,047 B2* | 4/2022 | Ito | F02C 9/40 |
| 11,898,502 B2* | 2/2024 | Zafar | F02C 7/1435 |
| 2004/0107701 A1* | 6/2004 | Miyake | F23N 5/003 60/794 |
| 2009/0053036 A1 | 2/2009 | Crawley et al. | |
| 2009/0235634 A1 | 9/2009 | Wang et al. | |
| 2010/0131169 A1 | 5/2010 | DiAntonio et al. | |
| 2013/0199192 A1 | 8/2013 | Zhang et al. | |
| 2015/0000290 A1* | 1/2015 | Joshi | F01K 23/10 60/39.511 |
| 2020/0018231 A1* | 1/2020 | Ito | F02C 9/28 |
| 2021/0381432 A1* | 12/2021 | Leach | F02C 9/263 |
| 2022/0195948 A1* | 6/2022 | Zafar | F02C 3/30 |

FOREIGN PATENT DOCUMENTS

| | | |
|---|---|---|
| EP | 3 604 930 | 2/2020 |
| JP | 7-1372 | 2/1995 |
| JP | 2009-52548 | 3/2009 |
| JP | 2009-228678 | 10/2009 |
| JP | 2010-121623 | 6/2010 |
| JP | 2013-160227 | 8/2013 |
| JP | 2015-147201 | 8/2015 |
| JP | 2018-162936 | 10/2018 |
| JP | 2018-162939 | 10/2018 |

OTHER PUBLICATIONS

Written Opinion of the International Searching Authority issued Apr. 5, 2022 in corresponding International Application No. PCT/JP2022/004264 with English Translation.

\* cited by examiner

GAS TURBINE EQUIPMENT WITH COMPRESSOR AIRFLOW CONTROL RESPONSIVE TO NOx CONCENTRATION AND CONTROL METHOD THEREOF

TECHNICAL FIELD

The present disclosure relates to gas turbine equipment and a gas turbine control method.

This application claims the right of priority based on Japanese Patent Application No. 2021-021754 filed with the Japan Patent Office on Feb. 15, 2021, the content of which is incorporated herein by reference.

BACKGROUND ART

A gas turbine includes a compressor that compresses air, a combustor that burns fuel in the air compressed by the compressor to generate a combustion gas, and a turbine that is driven by the combustion gas.

In such gas turbines, NOx is generated due to combustion of fuel. The emission amount of the NOx is regulated by laws and the like. Therefore, a technique for reducing the emission amount of NOx is desired.

For example, PTL 1 below discloses a technique for reducing the emission amount of NOx by heating air before the air is sucked into a compressor.

CITATION LIST

Patent Literature

[PTL 1] Japanese Unexamined Patent Application Publication No. 2013-160227

SUMMARY OF INVENTION

Technical Problem

In recent years, attention has been focused on using ammonia as fuel for gas turbines.

Therefore, an object of the present disclosure is to provide a technique capable of reducing the emission amount of NOx in a case where ammonia is used as fuel for a gas turbine.

Solution to Problem

Gas turbine equipment as an aspect for achieving the above object includes
  a gas turbine, a NOx concentration meter that detects NOx concentration in an exhaust gas which is a combustion gas exhausted from the gas turbine, and a control device. The gas turbine includes a compressor capable of compressing air to generate compressed air, a combustor capable of burning ammonia as fuel in the compressed air to generate a combustion gas, and a turbine capable of being driven by the combustion gas. The compressor includes a compressor rotor rotatable with an axis as a center, a compressor casing that covers the compressor rotor, and an intake air adjuster that adjusts an intake air amount that is a flow rate of air that is sucked into the compressor casing. The combustor includes a combustion chamber forming device that forms a combustion chamber in which the fuel is burned and which is capable of leading the combustion gas generated by combustion of the fuel to the turbine, and a combustor main body capable of injecting the ammonia and main combustion air, which is part of the compressed air, into the combustion chamber. The combustion chamber forming device is formed with an opening through which dilution air, which is part of the compressed air, is capable of being introduced into the combustion chamber from outside the combustion chamber forming device. The combustor is configured such that a rich combustion area in which fuel from the combustor main body is burned in a fuel-air ratio, which is a ratio of fuel to air, larger than a stoichiometric fuel-air ratio, and a lean combustion area in which a gas from the rich combustion area is diluted with the dilution air from the opening and fuel contained in the gas after being diluted with the dilution air is burned in a fuel-air ratio smaller than the stoichiometric fuel-air ratio are formed in the combustion chamber. The control device includes an intake air controller that controls an operation of the intake air adjuster such that the intake air amount is reduced, according to the NOx concentration in the exhaust gas detected by the NOx concentration meter.

The amount of NOx generated changes according to the fuel-air ratio in a combustion area of fuel. The combustor of this aspect is a combustor in which a rich combustion area and a lean combustion area are formed in a combustion chamber. Therefore, the combustor of this aspect is a combustor that adopts the RQL (rich burn-quick quench-lean burn) method. Further, the combustor of this aspect uses ammonia as fuel. In such a combustor, during a process in which a gas turbine is transitioned from a rated load operation to a partial load operation, and when the gas turbine is operating at a partial load (hereinafter referred to as a partial load operation) or the like, a combustion chamber fuel-air ratio, which is the ratio of the total fuel flow rate that is injected into the combustion chamber to the total combustion air flowing into the combustion chamber, becomes smaller than that during the rated load operation. The amount of NOx generated in the combustor changes according to the fuel-air ratio in a combustion area of fuel, not only in a combustor that adopts the RQL method. In a combustor that adopts the RQL method and uses ammonia as fuel, during the partial load operation, both the fuel-air ratios in the rich combustion area and the lean combustion area decrease, and the NOx concentration in the combustion gas of the combustor that is discharged from the combustor increases.

In this aspect, when the NOx concentration in the exhaust gas becomes equal to or higher than a predetermined value, the intake air controller controls the operation of the intake air adjuster such that the intake air amount is reduced. In a combustor of this aspect that adopts the RQL method, when the intake air amount is small, both the fuel-air ratios in the rich combustion area and the lean combustion area increase. As a result, in this aspect, the emission amount of NOx can be suppressed.

Gas turbine equipment as another aspect for achieving the above object includes
  a gas turbine, an air return line, a return air regulating valve, a NOx concentration meter that detects NOx concentration in an exhaust gas which is a combustion gas exhausted from the gas turbine, and a control device. The gas turbine includes a compressor capable of compressing air to generate compressed air, a combustor capable of burning fuel in the compressed air to generate a combustion gas, and a turbine capable of being driven by the combustion gas. The combustor includes a combustion chamber forming device that forms a combustion chamber in which the fuel is burned and which is capable of leading the combustion gas generated by combustion of the fuel to the turbine, and a combustor main body capable of injecting ammonia as the fuel and main combustion air, which is part of the compressed air, into the combustion chamber. The combustion chamber forming device is formed with an opening through which dilution air, which is part of the compressed air, is capable of being introduced into the combustion chamber from outside the combustion chamber forming device. The combustor is configured such that a rich combustion area in which fuel from the combustor main body is burned in a fuel-air ratio, which is a ratio of fuel to air, larger than a stoichiometric fuel-air ratio, and a lean combustion area in which a gas from the rich combustion area is diluted with the dilution air from the opening and fuel contained in the gas after being diluted with the dilution air is burned in a fuel-air ratio smaller than the stoichiometric fuel-air ratio are formed in the combustion chamber. The air return line is configured to return part of the compressed air discharged from the compressor casing back into the compressor casing. The return air regulating valve is configured to be capable of regulating a flow rate of return air, which is the compressed air flowing through the air return line. The control device includes a return air controller that controls the return air regulating valve such that a flow rate of the return air is increased, according to NOx concentration in an exhaust gas which is a combustion gas that is exhausted from the turbine.

In this aspect, when the NOx concentration in the exhaust gas becomes equal to or higher than a predetermined value, the return air controller controls the operation of the return air regulating valve such that the flow rate of the return air is increased. In the combustor of this aspect that adopts the RQL method, when the flow rate of the return air increases, both the fuel-air ratios in the rich combustion area and the lean combustion area increase. As a result, in this aspect, the emission amount of NOx can be suppressed.

Gas turbine equipment as still another aspect for achieving the above object includes a gas turbine, a dilution air regulating valve, and a control device. The gas turbine includes a compressor capable of compressing air to generate compressed air, a combustor capable of burning ammonia as fuel in the compressed air to generate a combustion gas, and a turbine capable of being driven by the combustion gas. The compressor includes a compressor rotor rotatable with an axis as a center, and a compressor casing that covers the compressor rotor. The combustor includes a combustion chamber forming device that forms a combustion chamber in which the fuel is burned and which is capable of leading the combustion gas generated by combustion of the fuel to the turbine, and a combustor main body capable of injecting the ammonia and main combustion air, which is part of the compressed air, into the combustion chamber. The combustion chamber forming device is formed with an opening through which dilution air, which is part of the compressed air, is capable of being introduced into the combustion chamber from outside the combustion chamber forming device. The combustor is configured such that a rich combustion area in which fuel from the combustor main body is burned in a fuel-air ratio, which is a ratio of fuel to air, larger than a stoichiometric fuel-air ratio, and a lean combustion area in which a gas from the rich combustion area is diluted with the dilution air from the opening and fuel contained in the gas after being diluted with the dilution air is burned in a fuel-air ratio smaller than the stoichiometric fuel-air ratio are formed in the combustion chamber. The dilution air regulating valve is a valve capable of regulating a flow rate of the dilution air that is introduced into the combustion chamber from the opening. The control device includes a dilution air controller that controls the dilution air regulating valve such that a flow rate of the dilution air increases, according to NOx concentration in an exhaust gas which is a combustion gas that is exhausted from the turbine.

In this aspect, when the flow rate of the dilution air flowing into the combustion chamber in the combustor that adopts the RQL method is increased with the control of the dilution air regulating valve by the dilution air controller, the flow rate of the main combustion air that is injected from the combustor main body into the combustion chamber is reduced. Therefore, in this aspect, when the NOx concentration in the exhaust gas becomes equal to or higher than a predetermined value, the fuel-air ratio in the lean combustion area is reduced and the fuel-air ratio in the rich combustion area is increased. As a result, in this aspect, the emission amount of NOx can be suppressed.

A gas turbine control method as an aspect for achieving the above object is applied to the following gas turbine.

The gas turbine includes a compressor capable of compressing air to generate compressed air, a combustor capable of burning fuel in the compressed air to generate a combustion gas, and a turbine capable of being driven by the combustion gas. The compressor includes a compressor rotor rotatable with an axis as a center, and a compressor casing that covers the compressor rotor. The combustor includes a combustion chamber forming device that forms a combustion chamber in which the fuel is burned and which is capable of leading the combustion gas generated by combustion of the fuel to the turbine, and a combustor main body capable of injecting ammonia as the fuel and main combustion air, which is part of the compressed air, into the combustion chamber. The combustion chamber forming device is formed with an opening through which dilution air, which is part of the compressed air, is capable of being introduced into the combustion chamber from outside the combustion chamber forming device.

The control method of this aspect includes: a combustion step of injecting the ammonia as the fuel and the main combustion air from the combustor main body into the combustion chamber and introducing the dilution air into the combustion chamber from the opening to form, in the combustion chamber, a rich combustion area in which fuel from the combustor main body is burned in a fuel-air ratio, which is a ratio of fuel to air, larger than a stoichiometric fuel-air ratio, and a lean combustion area in which a gas from the rich combustion area is diluted with the dilution air from the opening and fuel contained in the gas after being diluted with the dilution air is burned in a fuel-air ratio smaller than the stoichiometric fuel-air ratio; a NOx concentration detection step of detecting NOx concentration in an exhaust gas, which is a combustion gas generated by combustion of the fuel and exhausted from the gas turbine; and an intake air control step of reducing an intake air amount, which is a flow rate of air that is sucked into the compressor casing, according to the NOx concentration in the exhaust gas detected in the NOx concentration detection step.

A gas turbine control method as another aspect for achieving the above object is applied to the following gas turbine.

The gas turbine includes a compressor capable of compressing air to generate compressed air, a combustor capable of burning fuel in the compressed air to generate a combustion gas, and a turbine capable of being driven by the combustion gas. The compressor includes a compressor rotor rotatable with an axis as a center, and a compressor casing that covers the compressor rotor. The combustor includes a combustion chamber forming device that forms a combustion chamber in which the fuel is burned and which is capable of leading the combustion gas generated by combustion of the fuel to the turbine, and a combustor main body capable of injecting ammonia as the fuel and main combustion air, which is part of the compressed air, into the combustion chamber. The combustion chamber forming device is formed with an opening through which dilution air, which is part of the compressed air, is capable of being introduced into the combustion chamber from outside the combustion chamber forming device.

The control method of this aspect includes: a combustion step of injecting the ammonia as the fuel and the main combustion air from the combustor main body into the combustion chamber and introducing the dilution air into the combustion chamber from the opening to form, in the combustion chamber, a rich combustion area in which fuel from the combustor main body is burned in a fuel-air ratio, which is a ratio of fuel to air, larger than a stoichiometric fuel-air ratio, and a lean combustion area in which a gas from the rich combustion area is diluted with the dilution air from the opening and fuel contained in the gas after being diluted with the dilution air is burned in a fuel-air ratio smaller than the stoichiometric fuel-air ratio; a NOx concentration detection step of detecting NOx concentration in an exhaust gas, which is a combustion gas generated by combustion of the fuel and exhausted from the gas turbine; and a return air control step of increasing a flow rate that is returned into the compressor casing with part of the compressed air discharged from the compressor casing as return air, according to the NOx concentration in the exhaust gas detected in the NOx concentration detection step.

A gas turbine control method as still another aspect for achieving the above object is applied to the following gas turbine.

The gas turbine includes a compressor capable of compressing air to generate compressed air, a combustor capable of burning fuel in the compressed air to generate a combustion gas, and a turbine capable of being driven by the combustion gas. The compressor includes a compressor rotor rotatable with an axis as a center, and a compressor casing that covers the compressor rotor. The combustor includes a combustion chamber forming device that forms a combustion chamber in which the fuel is burned and which is capable of leading the combustion gas generated by combustion of the fuel to the turbine, and a combustor main body capable of injecting ammonia as the fuel and main combustion air, which is part of the compressed air, into the combustion chamber. The combustion chamber forming device is formed with an opening through which dilution air, which is part of the compressed air, is capable of being introduced into the combustion chamber from outside the combustion chamber forming device.

The control method of this aspect includes: a combustion step of injecting the ammonia as the fuel and the main combustion air from the combustor main body into the combustion chamber and introducing the dilution air into the combustion chamber from the opening to form, in the combustion chamber, a rich combustion area in which fuel from the combustor main body is burned in a fuel-air ratio, which is a ratio of fuel to air, larger than a stoichiometric fuel-air ratio, and a lean combustion area in which a gas from the rich combustion area is diluted with the dilution air from the opening and fuel contained in the gas after being diluted with the dilution air is burned in a fuel-air ratio smaller than the stoichiometric fuel-air ratio; a NOx concentration detection step of detecting NOx concentration in an exhaust gas, which is a combustion gas generated by combustion of the fuel and exhausted from the gas turbine; and a dilution air control step of increasing a flow rate of the dilution air according to the NOx concentration in the exhaust gas detected in the NOx concentration detection step.

Advantageous Effects of Invention

In an aspect of the present disclosure, in a case where ammonia is used as fuel for a gas turbine, the emission amount of NOx can be reduced.

DESCRIPTION OF EMBODIMENTS

Hereinafter, various embodiments and various modification examples of gas turbine equipment according to the present disclosure will be described using the drawings.

First Embodiment

Hereinafter, a first embodiment of the gas turbine equipment according to the present disclosure will be described using FIGS. 1 to 5.

Figure 1:
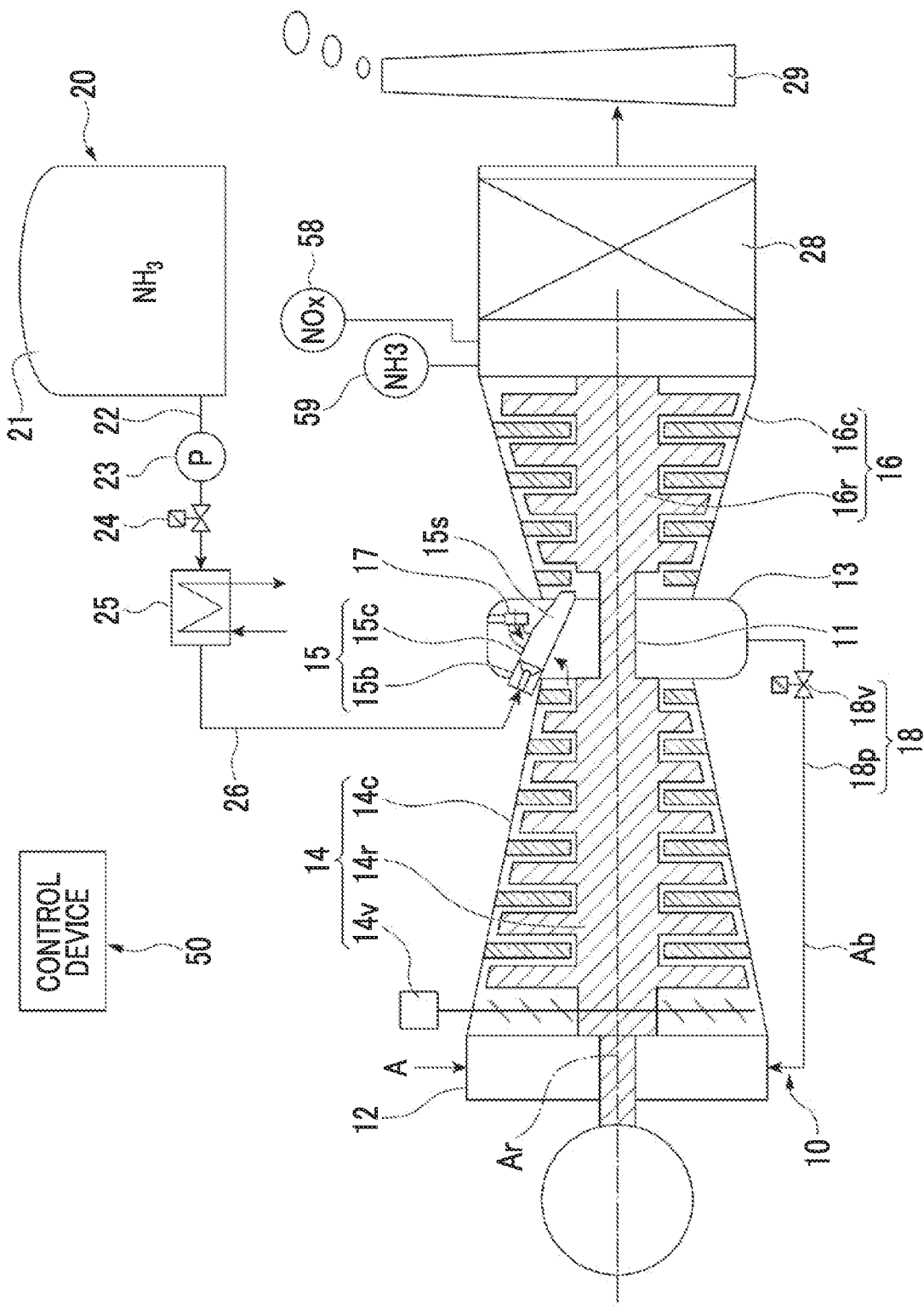
FIG. 1 is a schematic configuration view of gas turbine equipment in a first embodiment according to the present disclosure.

As shown in FIG. 1, the gas turbine equipment of the present embodiment includes a gas turbine 10, a compressed air return device 18, a denitration device 28 that decomposes NOx amount contained in an exhaust gas from the gas turbine 10, a chimney 29 that exhausts the exhaust gas flowing out from the denitration device 28 to the outside, fuel supply equipment 20 that supplies fuel to the gas turbine 10, and a control device 50.

The gas turbine 10 includes a compressor 14 that compresses air A, a combustor 15 that burns fuel in the air compressed by the compressor 14 to generate a combustion gas, a turbine 16 that is driven by the high-temperature and high-pressure combustion gas, an intake duct 12, an intermediate casing 13, and a dilution air regulating device 17.

The compressor 14 includes a compressor rotor 14r that rotates with a rotor axis Ar as a center, a compressor casing 14c that covers the compressor rotor 14r, and an intake air adjuster (hereinafter referred to as IGV (inlet guide vane)) 14v provided in a suction port of the compressor casing 14c. The IGV 14v regulates the intake air amount, which is the flow rate of air that is sucked into the compressor casing 14c, according to an instruction from the control device 50. The intake duct 12 is connected to the suction port of the compressor casing 14c.

The turbine 16 has a turbine rotor 16r that is rotated with the rotor axis Ar as a center by the combustion gas from the combustor 15, and a turbine casing 16c that covers the turbine rotor 16r. The turbine rotor 16r and the compressor rotor 14r are connected to each other to be rotatable with the same rotor axis Ar as a center, thereby forming a gas turbine rotor 11. For example, a rotor of a generator is connected to the gas turbine rotor 11.

The intermediate casing 13 is disposed between the compressor casing 14c and the turbine casing 16c in the direction in which the rotor axis Ar extends, and connects the compressor casing 14c and the turbine casing 16c. The compressed air discharged from the compressor 14 flows into the intermediate casing 13.

The combustor 15 is fixed to the intermediate casing 13. The combustor 15 includes a combustion chamber forming device 15c that forms a combustion chamber 15s inside, and a combustor main body 15b that injects ammonia as the fuel and the compressed air into the combustion chamber 15s. The combustion chamber forming device 15c is disposed inside the intermediate casing 13 into which the compressed air from the compressor 14 flows. In the combustion chamber 15s, the fuel is burned in the compressed air. The combustion gas generated by combustion of the fuel flows through the combustion chamber 15s and is sent to turbine 16.

Figure 2:
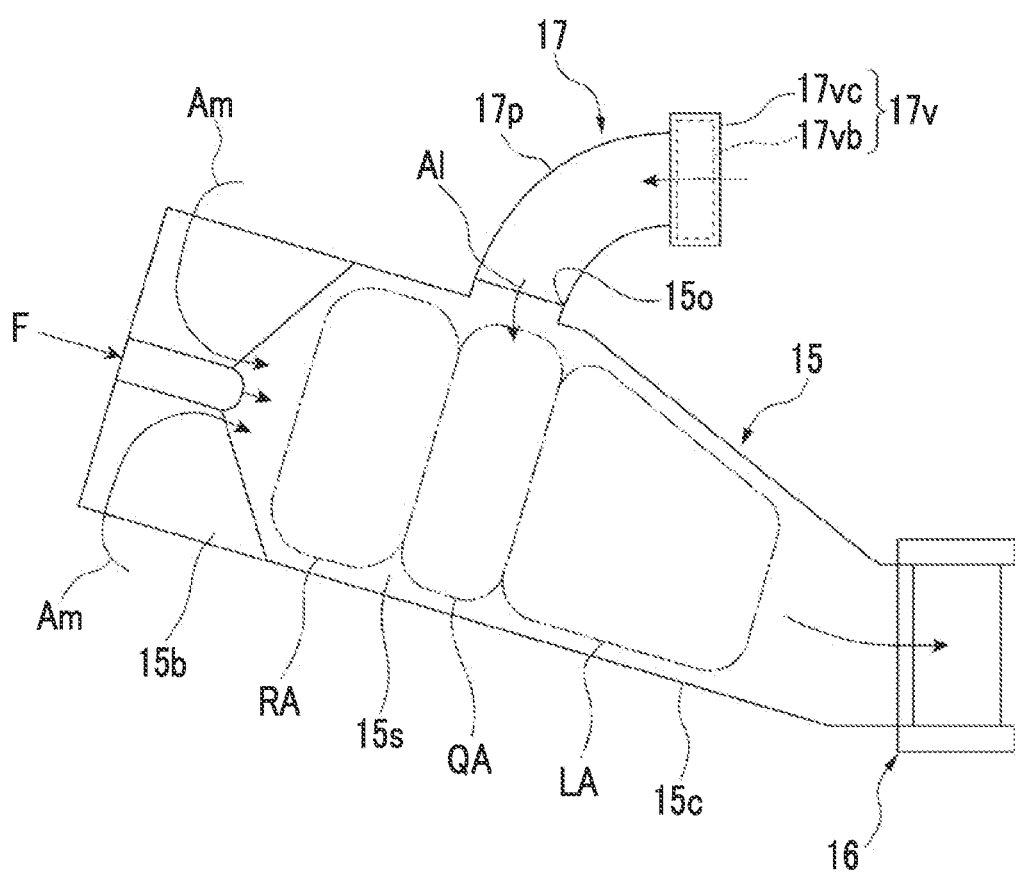
FIG. 2 is a schematic sectional view of a combustor in the first embodiment according to the present disclosure.

As shown in FIG. 2, the combustion chamber forming device 15c is formed with an opening 15o through which dilution air Al, which is part of the compressed air from the compressor 14, can be introduced into the combustion chamber 15s from outside the combustion chamber forming device 15c. The combustor 15 is configured such that a rich combustion area RA, a quench area QA, and a lean combustion area LA are formed in the combustion chamber 15s. The rich combustion area RA is an area where fuel F from the combustor main body 15b is burned in a fuel-air ratio, which is the ratio of fuel to air, larger than a stoichiometric fuel-air ratio. The quench area QA is an area where the dilution air Al from the opening 15o is introduced to dilute the gas from the rich combustion area RA. The lean combustion area LA is an area where the fuel contained in the gas from the quench area QA is burned in a fuel-air ratio smaller than the stoichiometric fuel-air ratio. Therefore, the combustor 15 is a combustor that adopts the RQL (rich burn-quick quench-lean burn) method. The lean combustion area LA can also be defined as an area in which the gas from the rich combustion area RA is diluted with the dilution air Al from the opening 15o and the fuel contained in the gas after being diluted with the dilution air Al is burned in a fuel-air ratio smaller than the stoichiometric fuel-air ratio.

The gas from the lean combustion area LA is sent to the turbine 16. The quench area QA is located on an upstream side of the lean combustion area LA in a gas flow in the combustion chamber 15s. Further, the rich combustion area RA is located on an upstream side of the quench area QA in the gas flow in the combustion chamber 15s. The combustor main body 15b injects ammonia as the fuel F and main combustion air Am which is part of the compressed air into the rich combustion area RA in the combustion chamber 15s.

The dilution air regulating device 17 is disposed within the intermediate casing 13. The dilution air regulating device 17 includes a dilution air regulating valve 17v and a dilution air line 17p. The dilution air line 17p connects the dilution air regulating valve 17v and the opening 15o of the combustion chamber forming device 15c. The dilution air regulating valve 17v regulates the flow rate of the dilution air Al that is introduced into the combustion chamber 15s via the dilution air line 17p and the opening 15o of the combustion chamber forming device 15c. The dilution air Al is part of the compressed air flowing into the intermediate casing 13 from the compressor 14. The dilution air regulating valve 17v has a valve casing 17vc and a valve body 17vb that slides inside the valve casing 17vc. An opening is formed in the valve body 17vb. A flow path area in the valve casing 17vc is changed by sliding the valve body 17vb with respect to the valve casing 17vc, so that the flow rate of the dilution air Al is regulated.

As shown in FIG. 1, the compressed air return device 18 has an air return line 18p and a return air regulating valve 18v. The air return line 18p connects the intermediate casing 13 and the intake duct 12, and can return part of the compressed air discharged from the compressor 14 back to the compressor 14 as return air Ab. The return air regulating valve 18v regulates the flow rate of the return air Ab flowing through the air return line 18p.

Ammonia is supplied to the denitration device 28. The denitration device 28 uses this ammonia to decompose NOx contained in the exhaust gas from the gas turbine 10 into nitrogen and water vapor.

The fuel supply equipment 20 includes an ammonia tank 21, a liquid ammonia line 22, an ammonia pump 23, a fuel regulating valve 24, a vaporizer 25, and a gaseous ammonia line 26.

Liquid ammonia is stored in the ammonia tank 21. The liquid ammonia line 22 connects the ammonia tank 21 and the vaporizer 25. The liquid ammonia line 22 is provided with the ammonia pump 23 that pressurizes the liquid ammonia from the ammonia tank 21, and the fuel regulating valve 24 that regulates the flow rate of the liquid ammonia flowing through the liquid ammonia line 22. The vaporizer 25 is a heat exchanger that performs heat-exchange between liquid ammonia and a heating medium to heat and vaporize the liquid ammonia. The gaseous ammonia line 26 connects the vaporizer 25 and the combustor 15. The gaseous ammonia line 26 leads the gaseous ammonia from the vaporizer 25 to the combustor 15 as fuel.

The gas turbine equipment further includes a NOx concentration meter 58 and an unburned content concentration meter 59.

The NOx concentration meter 58 detects the concentration of NOx contained in the exhaust gas exhaustedd from the gas turbine 10 and before flowing into the denitration device 28. The unburned content concentration meter 59 detects the concentration of ammonia that is an unburned content contained in the exhaust gas exhausted from the gas turbine 10 and before flowing into the denitration device 28.

Figure 3:
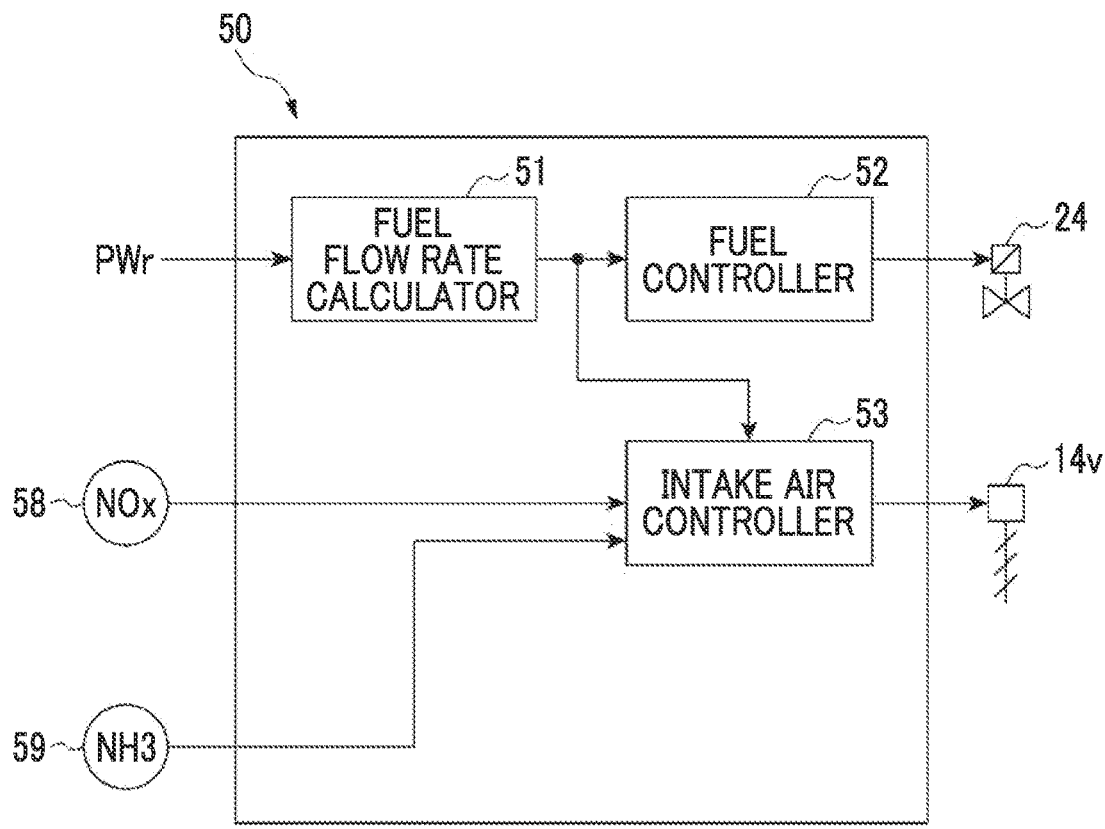
FIG. 3 is a functional block diagram of a control device in the first embodiment according to the present disclosure.

As shown in FIG. 3, the control device 50 includes a fuel flow rate calculator 51, a fuel controller 52, and an intake air controller 53. The fuel flow rate calculator 51 receives a load request PWr from the outside, obtains a fuel flow rate corresponding to the load request PWr, and outputs the obtained fuel flow rate. The fuel controller 52 controls the fuel regulating valve 24 such that the flow rate of the fuel flowing through the liquid fuel line reaches the fuel flow rate calculated by the fuel flow rate calculator 51. The intake air controller 53 controls the IGV 14v according to the fuel flow rate calculated by the fuel flow rate calculator 51, the NOx concentration detected by the NOx concentration meter 58, and the unburned content concentration detected by the unburned content concentration meter 59.

The control device 50 described above is a computer. The control device 50 includes, in terms of hardware, a CPU (central processing unit) that performs various arithmetic operations, a main storage device such as a memory that serves as a work area for the CPU, an auxiliary storage device such as a hard disk drive device, an input device such as a keyboard or a mouse, and a display device. Each of the functional units of the control device 50, such as the fuel flow rate calculator 51, the fuel controller 52, and the intake air controller 53, functions, for example, by executing a control program stored in the auxiliary storage device in the CPU.

Figure 5:
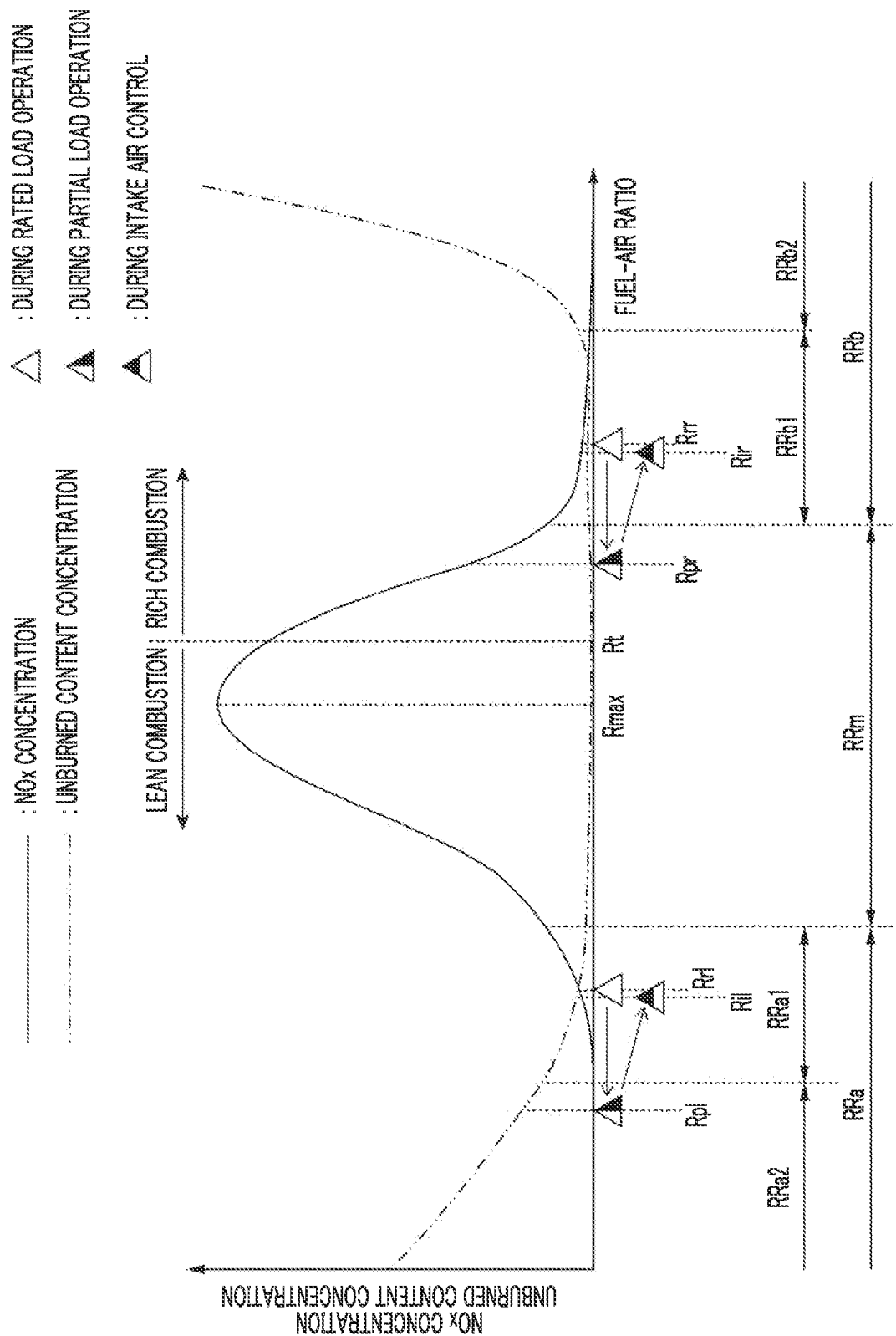
FIG. 5 is a graph showing the relationship between a fuel-air ratio, NOx concentration, and unburned content concentration in various operation modes in the first embodiment according to the present disclosure.

Here, the relationship between the fuel-air ratio in the combustor 15 that adopts the RQL method, as in the present embodiment, the NOx concentration, and the unburned content concentration will be described with reference to FIG. 5.

The NOx concentration reaches its maximum when the fuel-air ratio is in the vicinity of a stoichiometric fuel-air ratio Rt. In a fuel-air ratio region (hereinafter referred to as a middle fuel-air ratio region) RRrm that includes a fuel-air ratio (hereinafter referred to as a maximum NOx concentration fuel-air ratio) Rmax where the NOx concentration is at its maximum, the NOx concentration is higher than those in other fuel-air ratio regions RRa and RRb. The middle fuel-air ratio region RRm is a region that includes a region from the maximum NOx concentration fuel-air ratio Rmax to a fuel-air ratio that is smaller than the maximum NOx concentration fuel-air ratio Rmax by a predetermined amount, and a region from the maximum NOx concentration fuel-air ratio Rmax to a fuel-air ratio that is larger than the maximum NOx concentration fuel-air ratio Rmax by a predetermined amount. In the middle fuel-air ratio region RRm, the NOx concentration rapidly decreases as the fuel-air ratio decreases from the maximum NOx concentration fuel-air ratio Rmax. Further, in the middle fuel-air ratio region RRm, the NOx concentration rapidly decreases as the fuel-air ratio increases from the maximum NOx concentration fuel-air ratio Rmax.

In the small fuel-air ratio region RRa where the fuel-air ratio is smaller than that in the middle fuel-air ratio region RRm, the NOx concentration is extremely low, and even if the fuel-air ratio changes within the small fuel-air ratio region RRa, the NOx concentration hardly changes. Further, also in the large fuel-air ratio region RRb where the fuel-air ratio is larger than that in the middle fuel-air ratio region RRm, the NOx concentration is extremely low, and even if the fuel-air ratio changes within the large fuel-air ratio region RRb, the NOx Concentration hardly changes.

Meanwhile, in the middle fuel-air ratio region RRm, the unburned content concentration is extremely low, and even if the fuel-air ratio changes in the middle fuel-air ratio region RRm, the unburned content concentration hardly changes. In the small fuel-air ratio region RRa, the unburned content concentration gradually increases as the fuel-air ratio decreases. Further, in a region RRb1 having a small fuel-air ratio in the large fuel-air ratio region RRb, the unburned content concentration is extremely low, and even if the fuel-air ratio changes in the region RRb1, the unburned content concentration hardly changes. In a region RRb2 having a large fuel-air ratio in the large fuel-air ratio region RRb, the unburned content concentration rapidly increases as the fuel-air ratio increases.

During a rated load operation in which the gas turbine is operated under a rated load, a fuel-air ratio Rrr in the rich combustion area RA is located within the region RRb1 having a small fuel-air ratio in the large fuel-air ratio region RRb. Therefore, during the rated load operation, the NOx concentration and the unburned content concentration in the gas flowing out from the rich combustion area RA are extremely low. Further, during the rated load operation, a fuel-air ratio Rr1 in the lean combustion area LA is located within a region RRa1 having a large fuel-air ratio in the small fuel-air ratio region RRa. Therefore, during the rated load operation, the NOx concentration and the unburned content concentration in the gas flowing out from the lean combustion area LA are extremely low. A fuel-air ratio (hereinafter referred to as a combustion chamber fuel-air ratio) that is the ratio between the flow rate of the total combustion air (main combustion air Am+dilution air Al) flowing into the combustion chamber 15s and the flow rate of the fuel that is injected into the combustion chamber 15s is a value between the fuel-air ratio in the rich combustion area RA and the fuel-air ratio in the lean combustion area LA.

During a process in which the gas turbine 10 is transitioned from the rated load operation to a partial load operation, and when the gas turbine 10 is operating at a partial load (hereinafter referred to as a partial load operation) or the like, the fuel flow rate that is supplied to the combustor 15 decreases, and the combustion chamber fuel-air ratio becomes smaller than that during the rated load operation. In this relationship, during the partial load operation, a fuel-air ratio Rpr in the rich combustion area RA becomes smaller than the fuel-air ratio Rrr in the rich combustion area RA during the rated load operation, and is located within the middle fuel-air ratio region RRm. Therefore, during the partial load operation, the NOx concentration in the gas flowing out from the rich combustion area RA becomes higher than that during the rated load operation. Further, during the partial load operation, the unburned content concentration in the gas flowing out from the rich combustion area RA is extremely low, as in during the rated load operation.

As described above, during the simple partial load operation, the NOx concentration in the gas flowing out from the rich combustion area RA increases, so that there is a case where the NOx concentration in the exhaust gas that is exhausted from the gas turbine 10 becomes higher than a predetermined value.

Therefore, in the present embodiment, in order to reduce the NOx concentration during the partial load operation, in the present embodiment, the control of the intake air amount by the intake air controller 53 is executed.

Figure 4:
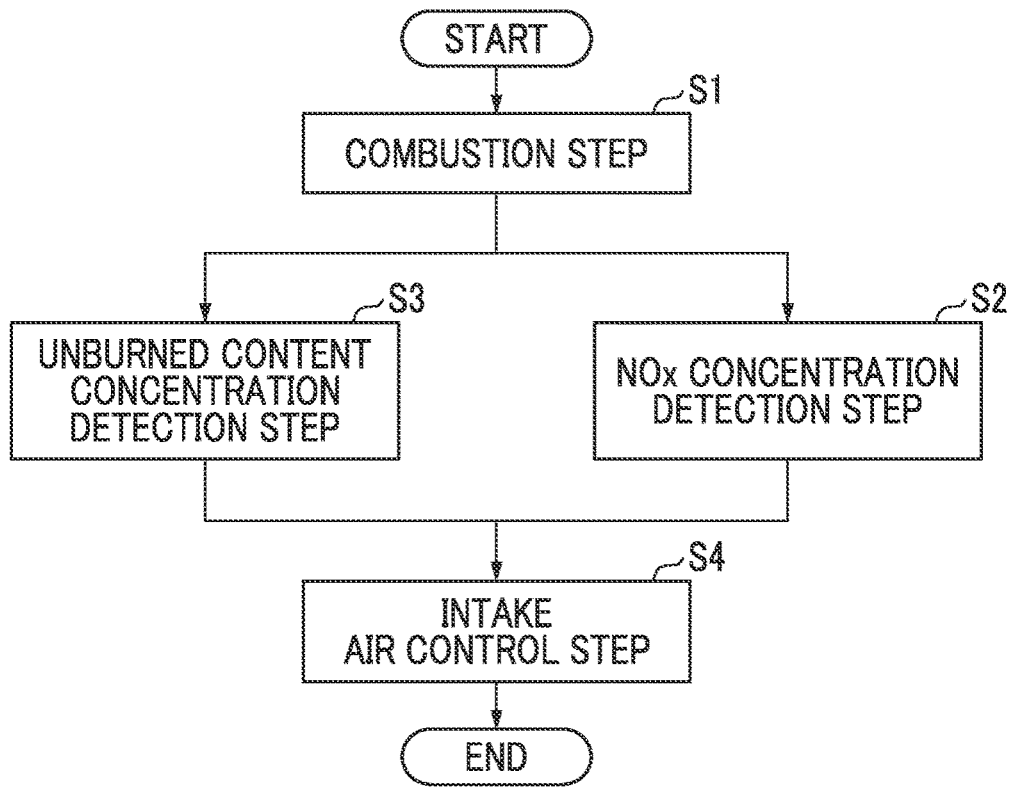
FIG. 4 is a flowchart showing a procedure in a gas turbine control method in the first embodiment according to the present disclosure.

Next, the procedure for executing the control method for the gas turbine 10 in the present embodiment will be described according to the flowchart shown in FIG. 4.

First, a combustion step S1 is executed. In the combustion step S1, the main combustion air Am and ammonia as the fuel F are injected from the combustor main body 15b into the combustion chamber 15s. Further, the dilution air Al is introduced into the quench area QA in the combustion chamber 15s from the opening 15o. As a result, in the combustion step S1, as described above, the rich combustion area RA, the quench area QA, and the lean combustion area LA are formed in the combustion chamber 15s.

During the execution of the combustion step S1, a NOx concentration detection step S2 and an unburned content concentration detection step S3 are executed. In the NOx concentration detection step S2, the NOx concentration in the exhaust gas is detected by the NOx concentration meter 58. Further, in the unburned content concentration detection step S3, the unburned content concentration in the exhaust gas is detected by the unburned content concentration meter 59.

In an intake air control step S4, the intake air controller 53 controls the operation of the IGV 14v such that the NOx concentration becomes lower than a predetermined value and the unburned content concentration falls within a predetermined unburned content concentration range, by reducing the intake air amount, which is the flow rate of the air that is sucked into the compressor casing 14c, according to the NOx concentration detected by the NOx concentration meter 58. Specifically, in the intake air control step S4, for example, first, the intake air controller 53 determines whether or not the NOx concentration detected by the NOx concentration meter 58 has become equal to or higher than a predetermined value. Then, when it is determined that the NOx concentration detected by the NOx concentration meter 58 has become equal to or higher than a predetermined value, the intake air controller 53 controls the operation of the IGV 14v such that the NOx concentration becomes lower than the predetermined value and the unburned content concentration falls within the predetermined unburned content concentration range, by reducing the intake air amount, which is the flow rate of the air that is sucked into the compressor casing 14c, by a predetermined amount. Further, when it is determined that the NOx concentration detected by the NOx concentration meter 58 is increasing, the intake air controller 53 may determine the intake air amount (or the IGV opening degree) according to the NOx concentration detected by the NOx concentration meter 58 by using a predetermined relationship. Here, the predetermined relationship is a relationship between the NOx concentration detected by the NOx concentration meter 58 and the intake air amount (or the IGV opening degree) in which the NOx concentration becomes lower than a predetermined value (and the unburned content concentration falls within a predetermined unburned content concentration range).

Here, the predetermined unburned content concentration range is a range between an upper limit unburned content concentration and a lower limit unburned content concentration, which are determined according to the NOx concentration. The unburned content in the exhaust gas that is exhausted from the gas turbine 10 is ammonia in the present embodiment. As described above, the denitration device 28 uses ammonia to decompose NOx contained in the exhaust gas from the gas turbine 10 into nitrogen and water vapor. Therefore, if the exhaust gas contains ammonia as the unburned content, the ammonia in the exhaust gas can be used for the decomposition reaction of NOx, and the amount of ammonia that is supplied to the denitration device 28 can be suppressed. Therefore, in the present embodiment, the operation of the IGV 14v is controlled such that the unburned content in the exhaust gas falls within an unburned content concentration range determined in advance according to the NOx concentration.

Due to the operation control of the IGV 14v described above, the opening degree of the IGV 14v is reduced and the intake air amount, which is the amount of air that is sucked into the compressor casing 14c, is reduced.

When a load is constant and the intake air amount decreases by a predetermined amount, the combustion chamber fuel-air ratio increases by a predetermined amount. As a result, as shown in FIG. 5, a fuel-air ratio Rir in the rich combustion area RA becomes larger than the fuel-air ratio Rpr in the rich combustion area RA during the above-described simple partial load operation by a predetermined amount even during the partial load operation, and is located within the region RRb1 having a small fuel-air ratio in the large fuel-air ratio region RRb. Therefore, the intake air amount is controlled as described above during the partial load operation, so that even during the partial load operation, the NOx concentration in the gas flowing out from the rich combustion area RA can be kept extremely low and the unburned content concentration in the gas flowing out from the rich combustion area RA can fall within a predetermined unburned content concentration range. Further, a fuel-air ratio Ril in the lean combustion area LA becomes larger than a fuel-air ratio Rpl in the lean combustion area LA during the above-described simple partial load operation by a predetermined amount even during the partial load operation, and is located within the region RRa1 having a large fuel-air ratio in the small fuel-air ratio region RRa. Therefore, the intake air amount is controlled as described above during the partial load operation, so that even during the partial load operation, the NOx concentration in the gas flowing out from the lean combustion area LA can be kept extremely low and the unburned content concentration in the gas flowing out from the lean combustion area LA can fall within a predetermined unburned content concentration range.

Therefore, in the present embodiment, even during the partial load operation, the NOx concentration in the exhaust gas that is exhausted from the gas turbine 10 can be kept extremely low, and the unburned content concentration in the exhaust gas can fall within a predetermined unburned content concentration range.

Second Embodiment

Figure 6:
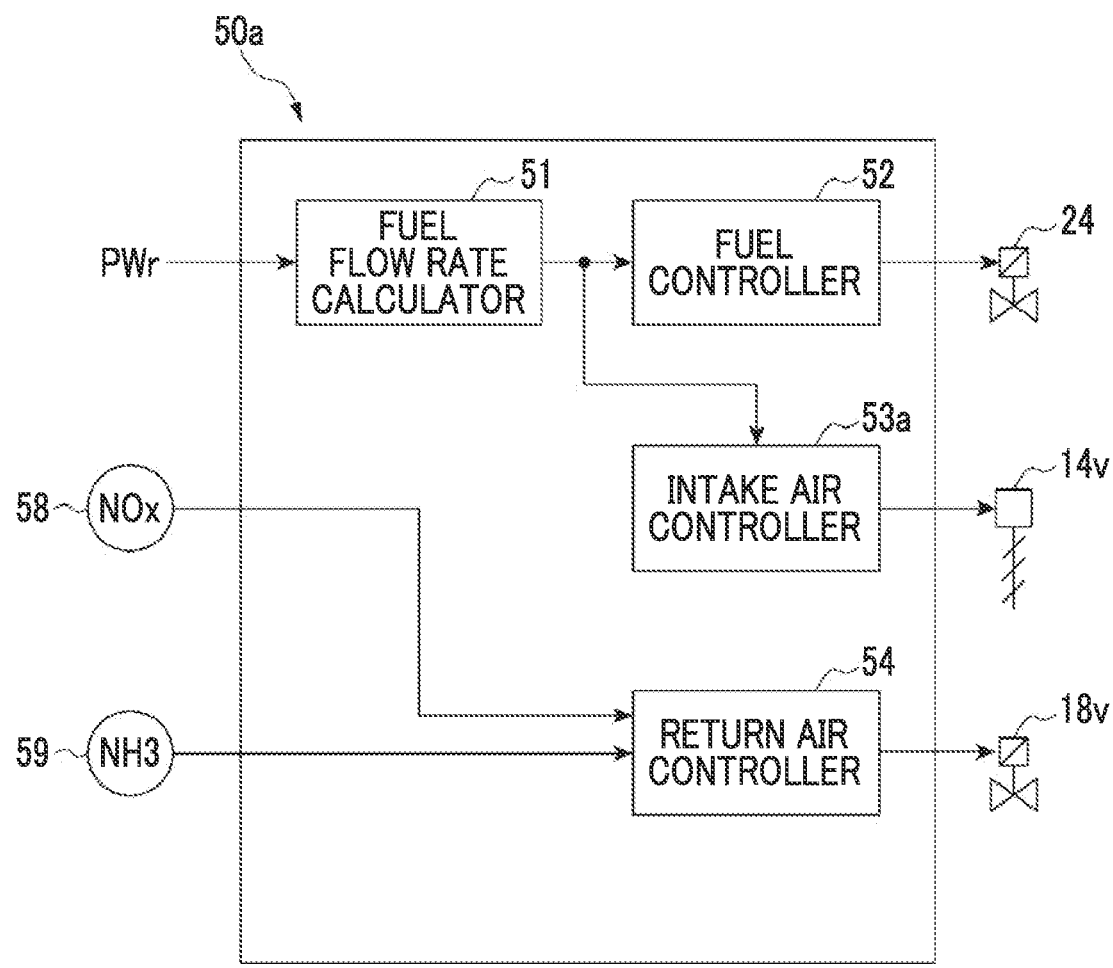
FIG. 6 is a functional block diagram of a control device in a second embodiment according to the present disclosure.
Figure 7:
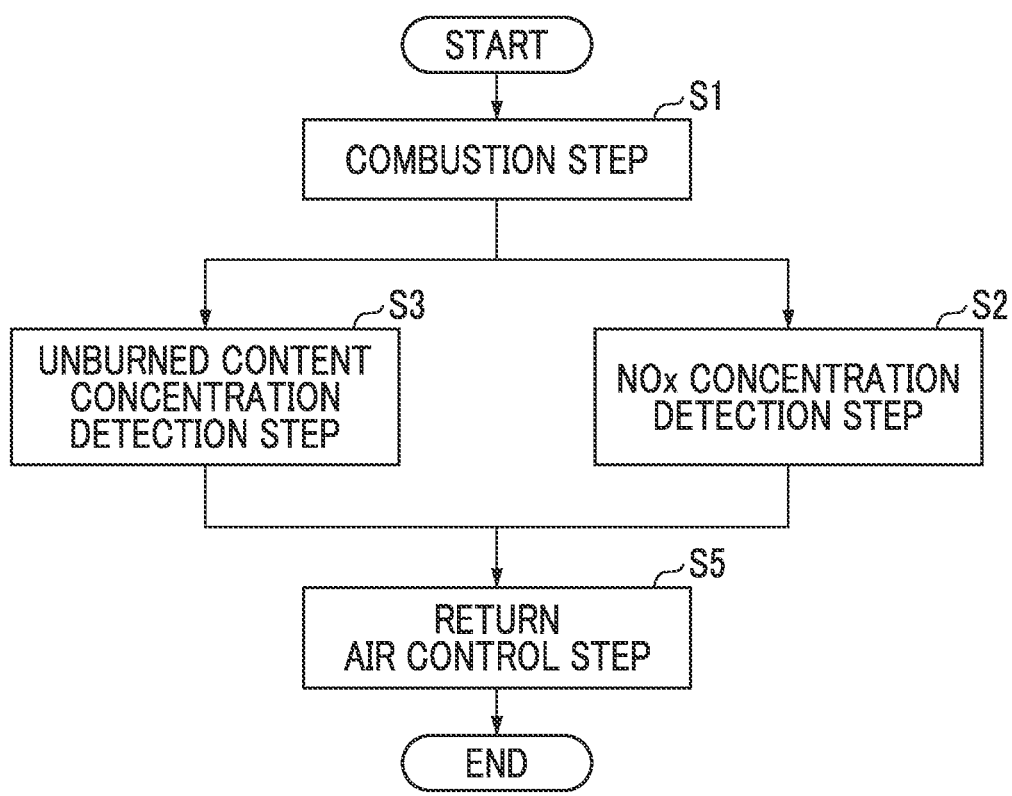
FIG. 7 is a flowchart showing a procedure in a gas turbine control method in the second embodiment according to the present disclosure.
Figure 8:
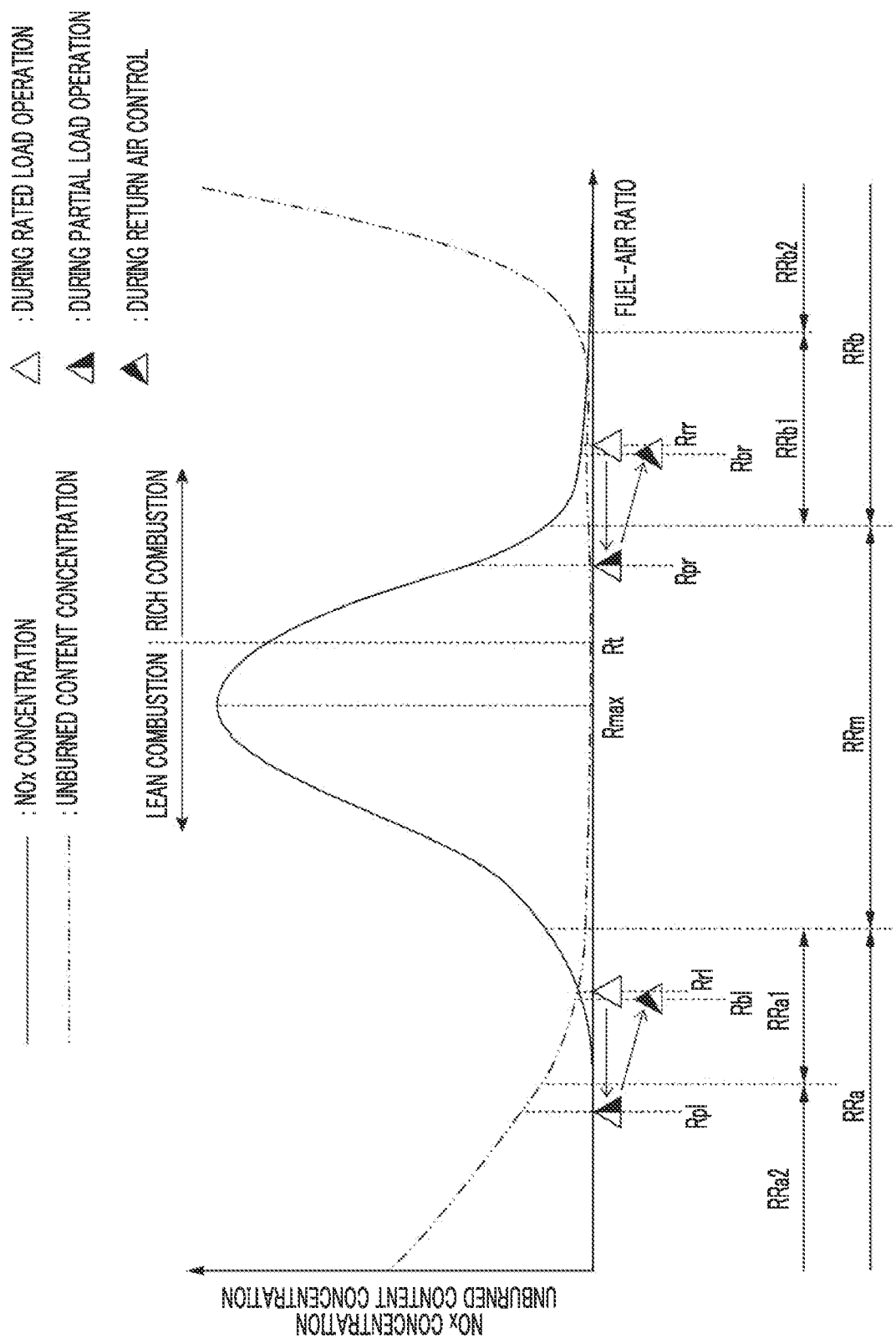
FIG. 8 is a graph showing the relationship between a fuel-air ratio, NOx concentration, and unburned content concentration in various operation modes in the second embodiment according to the present disclosure.

Hereinafter, a second embodiment of the gas turbine equipment according to the present disclosure will be described using FIGS. 6 to 8.

The gas turbine equipment of the present embodiment includes the gas turbine 10, the compressed air return device 18, the denitration device 28, the chimney 29, the fuel supply equipment 20, and a control device 50a, as in the first embodiment. However, as shown in FIG. 6, the control device 50a of the present embodiment is different from the control device 50 of the first embodiment.

The control device 50a of the present embodiment has the fuel flow rate calculator 51 and the fuel controller 52, as in the control device 50 of the first embodiment. The control device 50a of the present embodiment further includes a return air controller 54 and an intake air controller 53a different from the intake air controller 53 of the first embodiment.

The intake air controller 53a of the present embodiment controls the IGV 14v according to the fuel flow rate from the fuel flow rate calculator 51, as in the intake air controller 53 of the first embodiment. However, the intake air controller 53a of the present embodiment does not control the IGV 14v according to the NOx concentration detected by the NOx concentration meter 58 and the unburned content concentration detected by the unburned content concentration meter 59. Instead, the return air controller 54 controls the operation of the return air regulating valve 18v according to the NOx concentration detected by the NOx concentration meter 58 and the unburned content concentration detected by the unburned content concentration meter 59.

Next, the procedure for executing the control method for the gas turbine 10 in the present embodiment will be described according to the flowchart shown in FIG. 7.

First, as in the first embodiment, the combustion step S1 is executed. Further, during the execution of the combustion step S1, the NOx concentration detection step S2 and the unburned content concentration detection step S3 are executed, as in the first embodiment.

In a return air control step S5, the return air controller 54 controls the operation of the return air regulating valve 18v such that the NOx concentration becomes lower than a predetermined value and the unburned content concentration falls within a predetermined unburned content concentration range by increasing the flow rate of the return air Ab flowing through the air return line 18p by a predetermined amount according to the NOx concentration detected by the NOx concentration meter 58. Specifically, in the return air control step S5, for example, first, the return air controller 54 determines whether or not the NOx concentration detected by the NOx concentration meter 58 has become equal to or higher than a predetermined value. Then, when it is determined that the NOx concentration detected by the NOx concentration meter 58 has become equal to or higher than a predetermined value, the return air controller 54 controls the operation of the return air regulating valve 18v such that the NOx concentration becomes lower than a predetermined value and the unburned content concentration falls within a predetermined unburned content concentration range by increasing the flow rate of the return air Ab flowing through the air return line 18p by a predetermined amount. Due to the operation control of the return air regulating valve 18v, the opening degree of the return air regulating valve 18v is increased, and the flow rate of the return air Ab is increased by a predetermined amount. Further, when it is determined that the NOx concentration detected by the NOx concentration meter 58 is increasing, the return air controller 54 may determine the return air amount (or the opening degree of the return air regulating valve) according to the NOx concentration detected by the NOx concentration meter 58, by using a predetermined relationship. Here, the predetermined relationship is a relationship between the NOx concentration detected by the NOx concentration meter 58 and the return air amount (or the opening degree of the return air regulating valve) in which the NOx concentration becomes lower than a predetermined value (and the unburned content concentration falls within a predetermined unburned content concentration range).

When a load is constant and the flow rate of the return air Ab increases by a predetermined amount, the combustion chamber fuel-air ratio increases by a predetermined amount, as in a case where the intake air amount is reduced in the first embodiment. As a result, as shown in FIG. 8, a fuel-air ratio Rbr in the rich combustion area RA becomes larger than the fuel-air ratio Rpr in the rich combustion area RA during the above-described simple partial load operation by a predetermined amount even during the partial load operation, and is located within the region RRb1 having a small fuel-air ratio in the large fuel-air ratio region RRb. Therefore, the flow rate of the return air Ab is controlled as described above during the partial load operation, so that even during the partial load operation, the NOx concentration in the gas flowing out from the rich combustion area RA can be kept extremely low and the unburned content concentration in the gas flowing out from the rich combustion area RA can fall within a predetermined unburned content concentration range. Further, a fuel-air ratio Rb1 in the lean combustion area LA becomes larger than the fuel-air ratio Rpl in the lean combustion area LA during the above-described simple partial load operation by a predetermined amount even during the partial load operation, and is located within the region RRa1 having a large fuel-air ratio in the small fuel-air ratio region RRa. Therefore, the flow rate of the return air Ab is controlled as described above during the partial load operation, so that even during the partial load operation, the NOx concentration in the gas flowing out from the lean combustion area LA can be kept extremely low and the unburned content concentration in the gas flowing out from the lean combustion area LA can fall within a predetermined unburned content concentration range.

Therefore, in the present embodiment, even during the partial load operation, the NOx concentration in the exhaust gas that is exhausted from the gas turbine 10 can be kept extremely low, and the unburned content concentration in the exhaust gas can fall within a predetermined unburned content concentration range.

Third Embodiment

Figure 9:
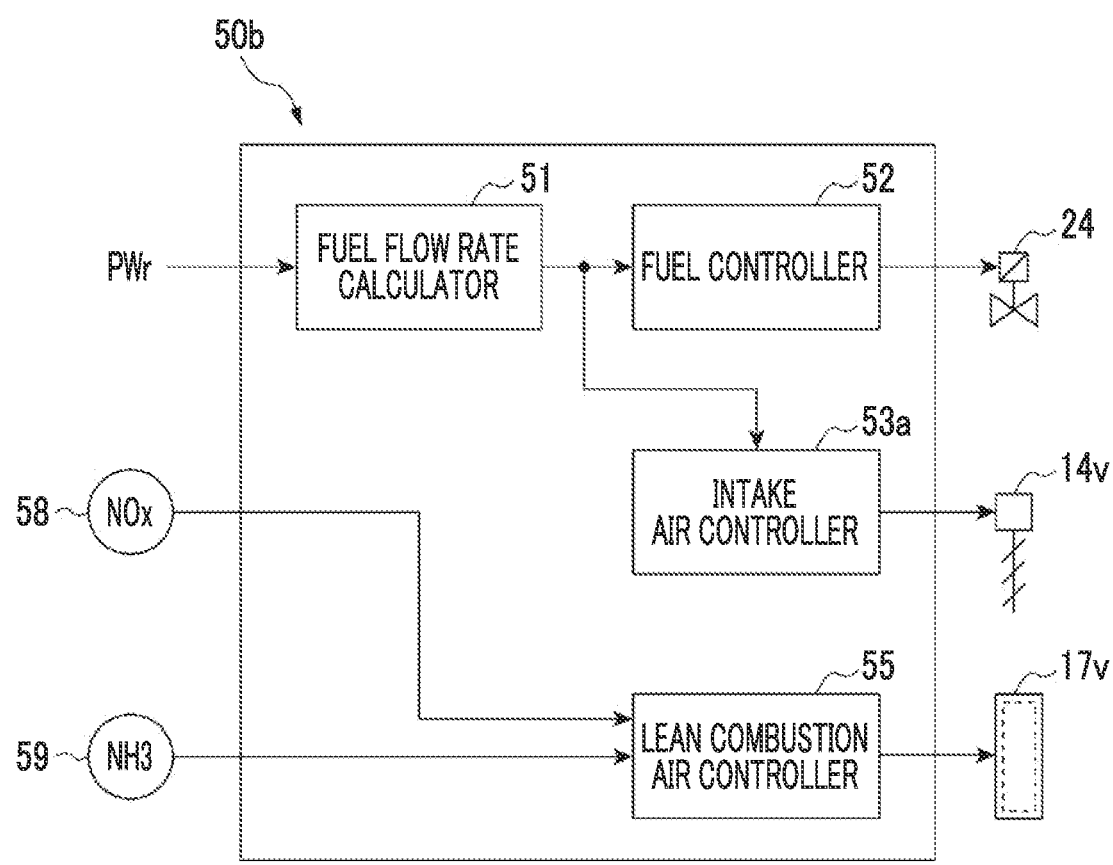
FIG. 9 is a functional block diagram of a control device in a third embodiment according to the present disclosure.
Figure 10:
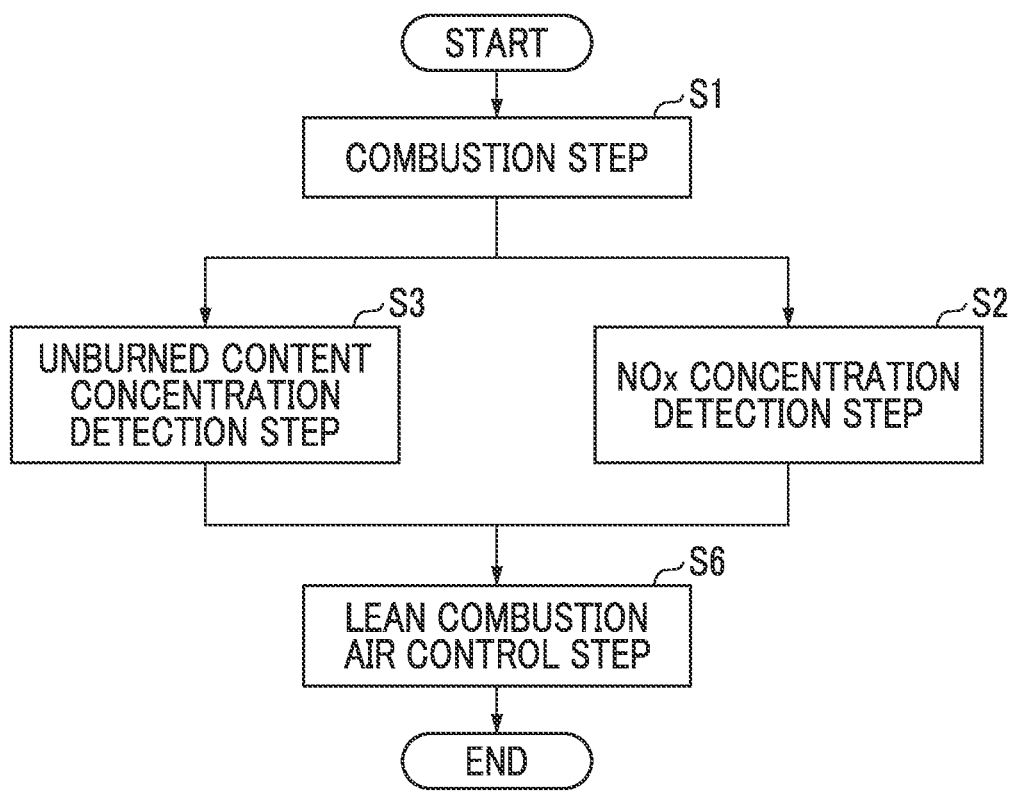
FIG. 10 is a flowchart showing a procedure in a gas turbine control method in the third embodiment according to the present disclosure.

Hereinafter, a third embodiment of the gas turbine equipment according to the present disclosure will be described using FIGS. 9 to 11.

The gas turbine equipment of the present embodiment includes the gas turbine 10, the compressed air return device 18, the denitration device 28, the chimney 29, the fuel supply equipment 20, and a control device 50b, as in the first embodiment. However, as shown in FIG. 9, the control device 50b of the present embodiment is different from the control device 50 of the first embodiment.

The control device 50b of the present embodiment has the fuel flow rate calculator 51 and the fuel controller 52, as in the control device 50 of the first embodiment. The control device 50b of the present embodiment further includes a dilution air controller 55 and the intake air controller 53a different from the intake air controller 53 of the first embodiment.

The intake air controller 53a of the present embodiment controls the IGV 14v according to the fuel flow rate from the fuel flow rate calculator 51, as in the intake air controller 53 of the first embodiment. However, the intake air controller 53a of the present embodiment does not control the IGV 14v according to the NOx concentration detected by the NOx concentration meter 58 and the unburned content concentration detected by the unburned content concentration meter 59, as in the intake air controller 53a of the second embodiment. Instead, the dilution air controller 55 controls the operation of the dilution air regulating valve 17v according to the NOx concentration detected by the NOx concentration meter 58 and the unburned content concentration detected by the unburned content concentration meter 59.

Next, the procedure for executing the control method for the gas turbine 10 in the present embodiment will be described according to the flowchart shown in FIG. 10.

First, as in the first embodiment, the combustion step S1 is executed. Further, during the execution of the combustion step S1, the NOx concentration detection step S2 and the unburned content concentration detection step S3 are executed, as in the first embodiment.

In a dilution air control step S6, the dilution air controller 55 controls the operation of the dilution air regulating valve 17v such that the NOx concentration becomes lower than a predetermined value and the unburned content concentration falls within a predetermined unburned content concentration range by increasing the flow rate of the dilution air Al that is introduced into the combustion chamber 15s by a predetermined amount according to the NOx concentration detected by the NOx concentration meter 58. Specifically, in the dilution air control step S6, for example, first, the dilution air controller 55 determines whether or not the NOx concentration detected by the NOx concentration meter 58 has become equal to or higher than a predetermined value. Then, when it is determined that the NOx concentration detected by the NOx concentration meter 58 has become equal to or higher than a predetermined value, the dilution air controller 55 controls the operation of the dilution air regulating valve 17v such that the NOx concentration becomes lower than a predetermined value and the unburned content concentration falls within a predetermined unburned content concentration range by increasing the flow rate of the dilution air Al that is introduced into the combustion chamber 15s by a predetermined amount. Due to the operation control of the dilution air regulating valve 17v, the flow rate of the dilution air Al flowing into the combustion chamber 15s is increased by a predetermined amount while the flow rate of the main combustion air Am that is injected from the combustor main body 15b into the combustion chamber 15s is reduced by a predetermined amount. Further, when it is determined that the NOx concentration detected by the NOx concentration meter 58 is increasing, the dilution air controller 55 may determine the dilution air amount (or the opening degree of the dilution air regulating valve) according to the NOx concentration detected by the NOx concentration meter 58 by using a predetermined relationship. Here, the predetermined relationship is a relationship between the NOx concentration detected by the NOx concentration meter 58 and the dilution air amount (or the opening degree of the dilution air regulating valve) in which the NOx concentration becomes lower than the predetermined value (and the unburned content concentration falls within a predetermined unburned content concentration range).

The combustion chamber fuel-air ratio does not change only with the above operation control of the dilution air regulating valve 17v.

Figure 11:
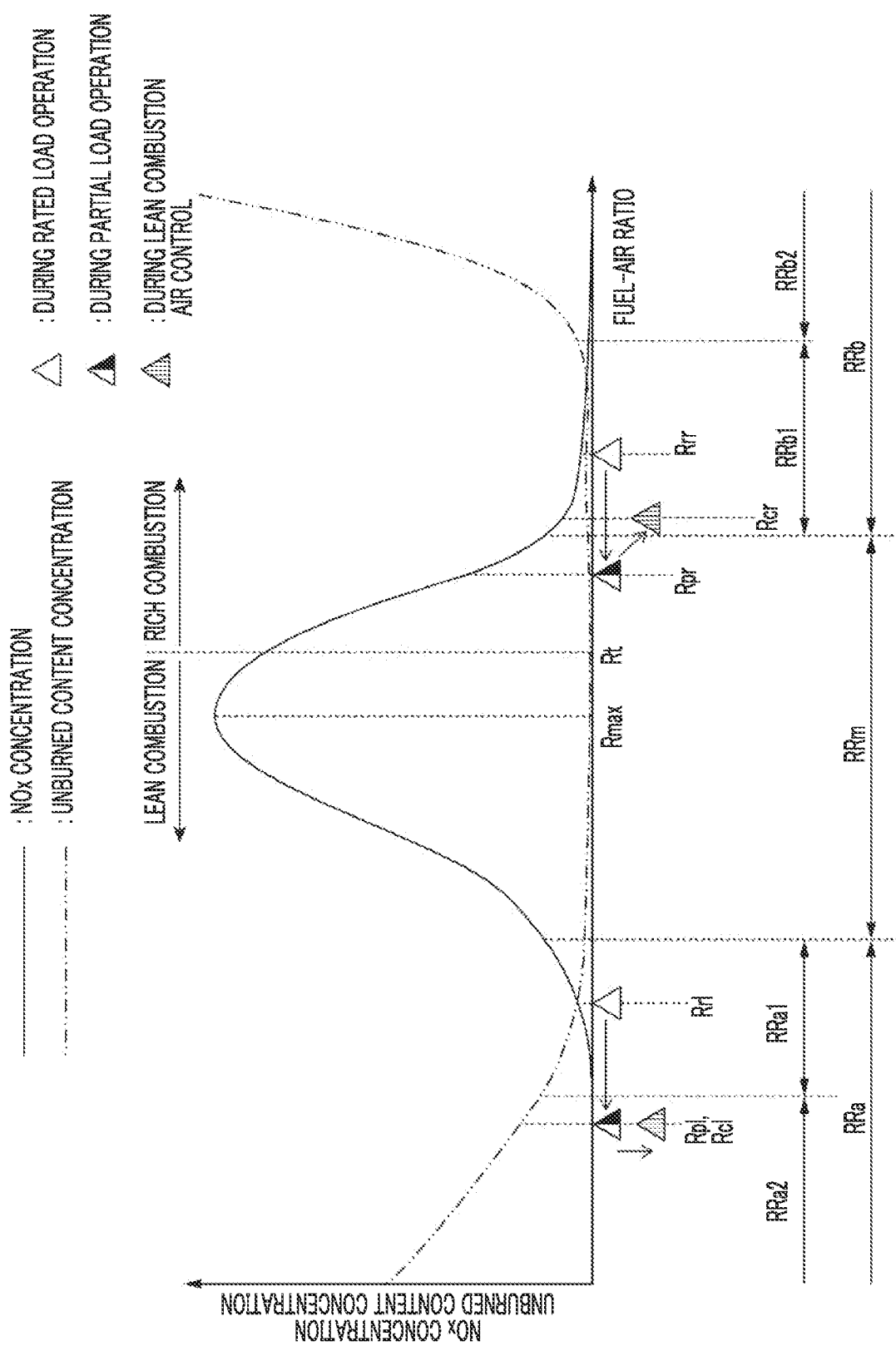
FIG. 11 is a graph showing the relationship between a fuel-air ratio, NOx concentration, and unburned content concentration in various operation modes in the third embodiment according to the present disclosure.

As described above, when the flow rate of the main combustion air Am that is injected into the combustion chamber 15s from the combustor main body 15b is reduced by a predetermined amount, as shown in FIG. 11, a fuel-air ratio Rcr in the rich combustion area RA becomes larger than the fuel-air ratio Rpr in the rich combustion area RA during the above-described simple partial load operation by a predetermined amount even during the partial load operation, and is located within the region RRb1 having a small fuel-air ratio in the large fuel-air ratio region RRb. Therefore, the flow rate of the dilution air Al is controlled as described above during the partial load operation, so that even during the partial load operation, the NOx concentration in the gas flowing out from the rich combustion area RA can be kept extremely low and the unburned content concentration in the gas flowing out from the rich combustion area RA can fall within a predetermined unburned content concentration range. Even if the flow rate of the dilution air Al increases by a predetermined amount, a fuel-air ratio Rcl in the lean combustion area LA does not change from the fuel-air ratio Rpl in the lean combustion area LA during the simple partial load operation described above. This is because even if the flow rate of the dilution air Al increases by a predetermined amount, the flow rate of the air in the gas flowing out from the rich combustion area RA decreases by a predetermined amount. Therefore, the flow rate of the dilution air Al is controlled as described above during the partial load operation, so that even during the partial load operation, the NOx concentration in the gas flowing out from the lean combustion area LA can be kept extremely low and the unburned content concentration in the gas flowing out from the lean combustion area LA can fall within a predetermined unburned content concentration range.

Therefore, also in the present embodiment, even during the partial load operation, the NOx concentration in the exhaust gas exhausted from the gas turbine 10 can be kept extremely low and the unburned content concentration in the exhaust gas can fall within a predetermined unburned content concentration range.

Fourth Embodiment

Figure 12:
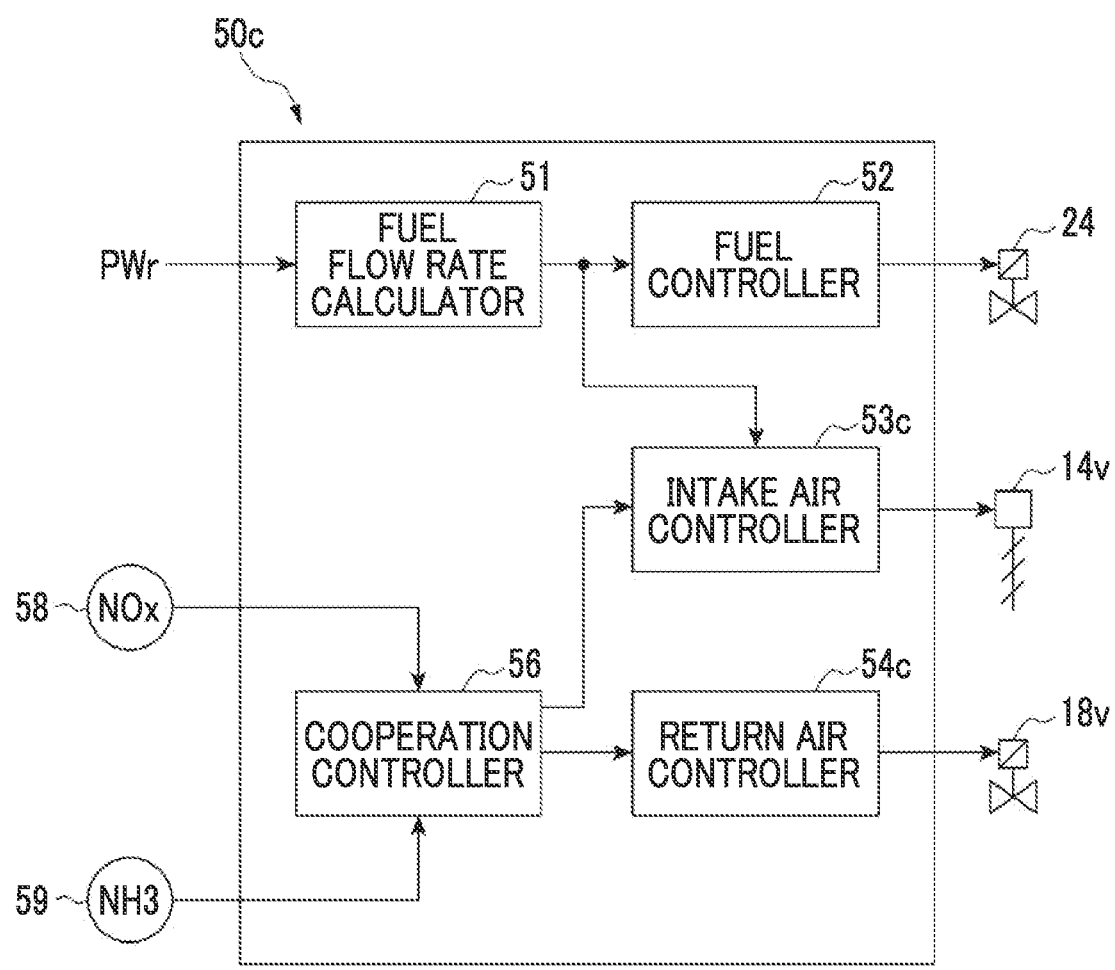
FIG. 12 is a functional block diagram of a control device in a fourth embodiment according to the present disclosure.
Figure 13:
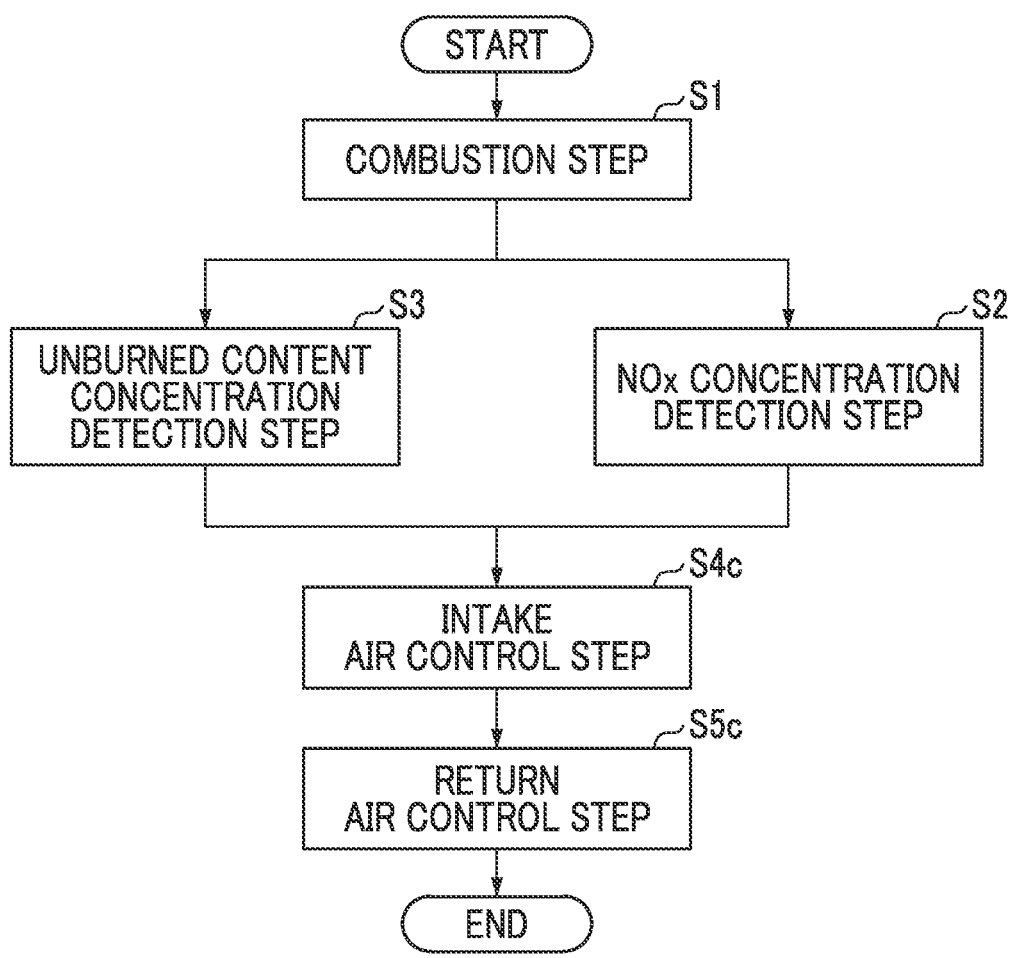
FIG. 13 is a flowchart showing a procedure in a gas turbine control method in the fourth embodiment according to the present disclosure.
Figure 14:
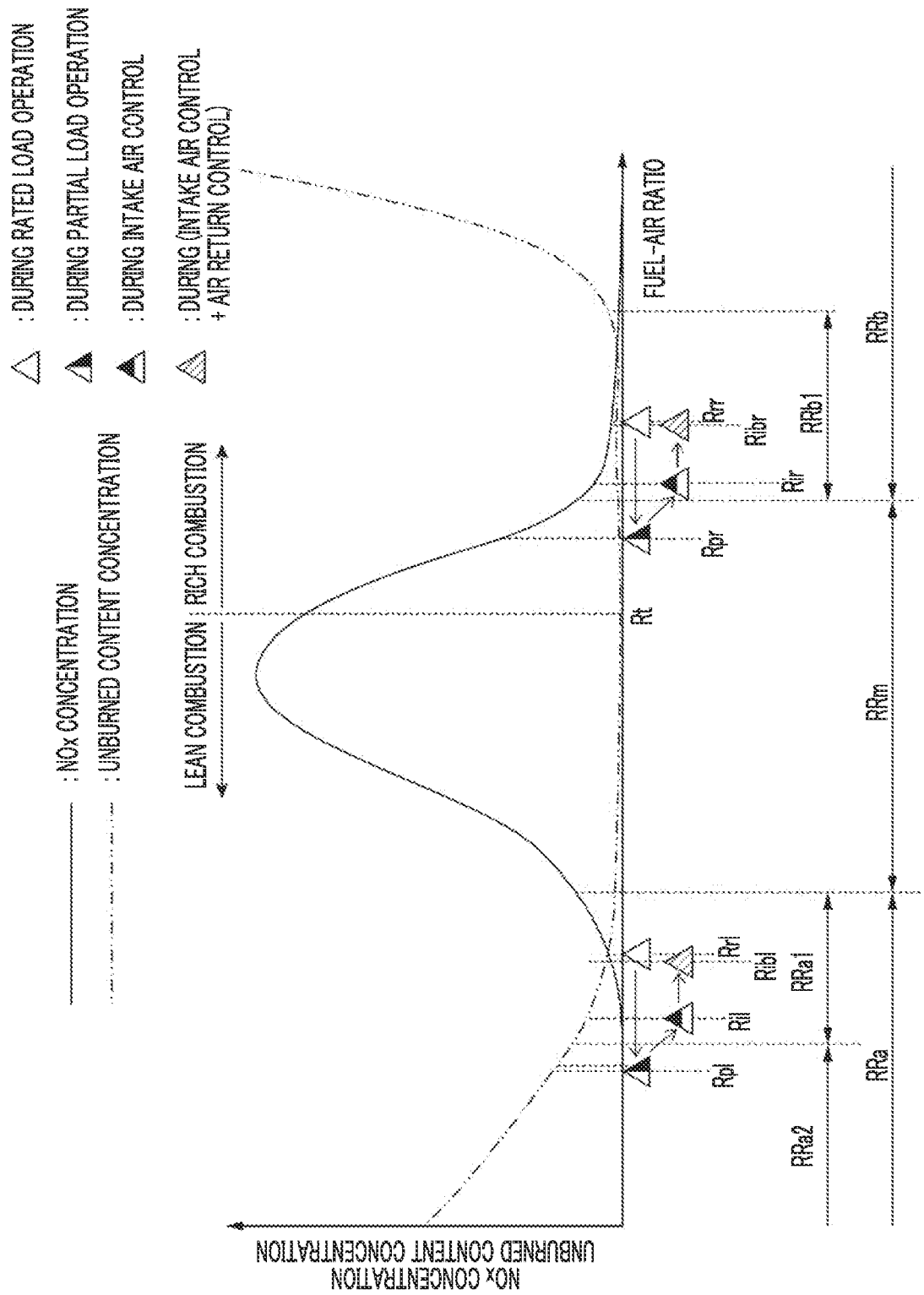
FIG. 14 is a graph showing the relationship between a fuel-air ratio, NOx concentration, and unburned content concentration in various operation modes in the fourth embodiment according to the present disclosure.

Hereinafter, a fourth embodiment of the gas turbine equipment according to the present disclosure will be described using FIGS. 12 to 14.

The gas turbine equipment of the present embodiment includes the gas turbine 10, the compressed air return device 18, the denitration device 28, the chimney 29, the fuel supply equipment 20, and a control device 50c, as in the first embodiment. However, as shown in FIG. 12, the control device 50c of the present embodiment is different from the control device 50 of the first embodiment.

The control device 50c of the present embodiment has the fuel flow rate calculator 51 and the fuel controller 52, as in the control device 50 of the first embodiment. The control device 50c of the present embodiment further includes a return air controller 54c, a cooperation controller 56, and an intake air controller 53c different from the intake air controller 53 of the first embodiment.

The intake air controller 53c of the present embodiment controls the IGV 14v according to the fuel flow rate from the fuel flow rate calculator 51, as in the intake air controller 53 of the first embodiment. Further, the intake air controller 53c of the present embodiment controls the IGV 14v according to an instruction from the cooperation controller 56. The return air controller 54c controls the return air regulating valve 18v according to an instruction from the cooperation controller 56. The cooperation controller 56 causes the operation control of the IGV 14v by the intake air controller 53c and the operation control of the return air regulating valve 18v by the return air controller 54c to cooperate with each other according to the NOx concentration detected by the NOx concentration meter 58 and the unburned content concentration detected by the unburned content concentration meter 59.

Next, the procedure for executing the control method for the gas turbine 10 in the present embodiment will be described according to the flowchart shown in FIG. 13.

First, as in the first embodiment, the combustion step S1 is executed. Further, during the execution of the combustion step S1, the NOx concentration detection step S2 and the unburned content concentration detection step S3 are executed, as in the first embodiment.

The cooperation controller 56 instructs the intake air controller 53c to control the IGV 14v according to the NOx concentration detected by the NOx concentration meter 58. Specifically, for example, the cooperation controller 56 determines whether or not the NOx concentration detected by the NOx concentration meter 58 has become equal to or higher than a predetermined value. Then, when it is determined that the NOx concentration detected by the NOx concentration meter 58 has become equal to or higher than a predetermined value, the cooperation controller 56 instructs the intake air controller 53c to control the IGV 14v. At this time, the cooperation controller 56 instructs the intake air controller 53c to reduce the intake air amount by a predetermined amount to make the NOx concentration lower than a predetermined value. When the intake air controller 53c receives this instruction, in an intake air control step S4c, the intake air controller 53c controls the operation of the IGV 14v such that the NOx concentration becomes lower than a predetermined value by reducing the intake air amount by a predetermined amount. Due to this operation control of the IGV 14v, the opening degree of the IGV 14v is reduced and the intake air amount that is sucked into the compressor casing 14c is reduced.

When the intake air amount is reduced by a predetermined amount, the combustion chamber fuel-air ratio increases by a predetermined amount. As a result, as shown in FIG. 14, the fuel-air ratio Rir in the rich combustion area RA becomes larger than the fuel-air ratio Rpr in the rich combustion area RA during the above-described simple partial load operation by a predetermined amount even during the partial load operation, and is located within the region RRb1 having a small fuel-air ratio in the large fuel-air ratio region RRb. Therefore, the intake air amount is controlled as described above during the partial load operation, so that even during the partial load operation, the NOx concentration in the gas flowing out from the rich combustion area RA can be kept extremely low and the unburned content concentration in the gas flowing out from the rich combustion area RA can fall within a predetermined unburned content concentration range. Further, the fuel-air ratio Ri1 in the lean combustion area LA becomes larger than the fuel-air ratio Rpl in the lean combustion area LA during the above-described simple partial load operation by a predetermined amount even during the partial load operation, and is located within the region RRa1 having a large fuel-air ratio in the small fuel-air ratio region RRa. Therefore, the intake air amount is controlled as described above during the partial load operation, so that even during the partial load operation, the NOx concentration in the gas flowing out from the lean combustion area LA can be kept extremely low and the unburned content concentration in the gas flowing out from the lean combustion area LA can be made lower than that in the simple partial load operation described above.

After the operation of the IGV 14v is controlled by the intake air controller 53c, the cooperation controller 56 determines whether the cases below are a first case, a second case, or a third case.

First case: a case where the unburned content concentration in the exhaust gas does not fall within a predetermined unburned content concentration range.

Second case: a case of receiving a request from an operator or the like to further reduce the unburned content concentration in the exhaust gas.

Third case: a case where the fuel-air ratio is not increased by a predetermined amount only with the operation of the IGV 14v.

After the operation of the IGV 14v is controlled by the intake air controller 53c, when the case is determined to be the first case or the second case, the cooperation controller 56 instructs the return air controller 54c to control the return air regulating valve 18v.

When the case is determined to be the first case, the cooperation controller 56 instructs the return air controller 54c to increase the flow rate of the return air Ab flowing through the air return line 18p by a predetermined amount such that the unburned content concentration falls within a predetermined unburned content concentration range. When the return air controller 54c receives this instruction, in a return air control step S5c, the return air controller 54c controls the return air regulating valve 18v such that the unburned content concentration falls within a predetermined unburned content concentration range by increasing the flow rate of the return air Ab flowing through the air return line 18p by a predetermined amount. Due to the operation control of the return air regulating valve 18v, the opening degree of the return air regulating valve 18v is increased, and the flow rate of the return air Ab is increased by a predetermined amount.

Further, when the case is determined to be the second case, the cooperation controller 56 instructs the return air controller 54c to further reduce the unburned content concentration by increasing the flow rate of the return air Ab flowing through the air return line 18p by a predetermined amount. When the return air controller 54c receives this instruction, in the return air control step S5c, the return air controller 54c controls the return air regulating valve 18v such that the unburned content concentration is further reduced by increasing the flow rate of the return air Ab flowing through the air return line 18p by a predetermined amount. Due to the operation control of the return air regulating valve 18v, the opening degree of the return air regulating valve 18v is increased, and the flow rate of the return air Ab is increased by a predetermined amount.

Further, when the case is determined to be the third case, the cooperation controller 56 instructs the return air controller 54c to increase the fuel-air ratio by a predetermined amount by increasing the flow rate of the return air Ab flowing through the air return line 18p by a predetermined amount. When the return air controller 54c receives this instruction, the return air controller 54c controls the return air regulating valve 18v such that the unburned content concentration falls within a predetermined unburned content concentration range. Due to the operation control of the return air regulating valve 18v, the opening degree of the return air regulating valve 18v is increased, and the flow rate of the return air Ab is increased by a predetermined amount.

Due to the execution of the return air control step S5c described above, as shown in FIG. 14, a fuel-air ratio Ribr in the rich combustion area RA becomes larger than the fuel-air ratio Rir in the rich combustion area RA after the execution of the above-described intake air control step S4c by a predetermined amount, and is located within the region RRb1 having a small fuel-air ratio in the large fuel-air ratio region RRb. Therefore, even during the partial load operation, the NOx concentration in the gas flowing out from the rich combustion area RA can be kept extremely low, and the unburned content concentration in the gas flowing out from the rich combustion area RA can fall within the predetermined unburned content concentration range, or the unburned content concentration in the gas flowing out from the rich combustion area RA can be further reduced. Further, a fuel-air ratio Ribl in the lean combustion area LA becomes larger than the fuel-air ratio Ri1 in the rich combustion area RA after the execution of the above-described intake air control step S4c by a predetermined amount, and is located within the region RRa1 having a large fuel-air ratio in the small fuel-air ratio region RRa.

Therefore, even during the partial load operation, the NOx concentration in the gas flowing out from the lean combustion area LA can be kept extremely low, and the unburned content concentration in the gas flowing out from the lean combustion area LA can fall within the predetermined unburned content concentration range, or the unburned content concentration in the gas flowing out from the lean combustion area LA can be further reduced.

Therefore, in the present embodiment, even during the partial load operation, the NOx concentration in the exhaust gas exhausted from the gas turbine 10 can be kept extremely low, and the unburned content concentration in the exhaust gas can fall within a predetermined unburned content concentration range, or the unburned content concentration in the exhaust gas can be further reduced.

As described above, the fuel-air ratio can be changed in both the execution of the intake air control step and the execution of the return air control step. Therefore, if any one of the intake air control step and the return air control step is executed, the NOx concentration and the unburned content concentration can be regulated. However, when the return air control step is executed, the flow rate of the return air increases, so that a load on the compressor 14 increases. Therefore, in a case where the return air control step is executed, the gas turbine efficiency becomes lower than in a case where the intake air control step is executed. In other words, the gas turbine efficiency becomes higher in a case where the intake air control step is executed than in a case where the return air control step is executed. Further, when the return air control step is executed, part of the high-temperature compressed air returns to the compressor 14, so that the temperature of the compressed air flowing into the combustor 15 becomes higher than in a case where the intake air control step is executed. As a result, when the return air control step is executed, the combustibility of the fuel becomes higher and the unburned content concentration becomes lower than in a case where the intake air control step is executed.

Therefore, in a case where the gas turbine efficiency is prioritized, it is preferable to execute the intake air control step, and in a case where a decrease in unburned content concentration is prioritized, it is preferable to execute the return air control step.

Therefore, in the present embodiment, first, the intake air control step S4c is executed in order to suppress a decrease in gas turbine efficiency while reducing the NOx concentration. Then, after the intake air control step S4c, in the first case or the second case described above, the return air control step S5c is executed in order to effectively reduce the unburned content concentration.

As described above, in the present embodiment, the return air control step S5c is executed after the intake air control step S4c is executed. However, the intake air control step S4c and the return air control step S5c may be executed in parallel. In this case, when the cooperation controller 56 determines that the NOx concentration detected by the NOx concentration meter 58 has become equal to or higher than a predetermined value, the cooperation controller 56 sets the amount of increase in the fuel-air ratio in the execution of the intake air control step S4c and the return air control step S5c to a predetermined amount according to the NOx concentration. Next, the cooperation controller 56 sets the ratio between the amount of increase in the fuel-air ratio in the execution of only the intake air control step S4c and the amount of increase in the fuel-air ratio in the execution of only the return air control step S5c to a predetermined ratio. Then, the cooperation controller 56 obtains the amount of increase in the fuel-air ratio in each step from this ratio and the amount of increase in the fuel-air ratio in the execution of each of the intake air control step S4c and the return air control step S5c. Finally, the cooperation controller 56 transmits the amount of increase in the fuel-air ratio due to the execution of the intake air control step S4c to the intake air controller 53c and the amount of increase in the fuel-air ratio due to the execution of the return air control step S5c to the return air controller 54c. That is, in this case, the intake air controller 53c controls the intake air adjuster and the return air controller 54c controls the return air regulating valve 18v such that the ratio between the amount of change in the fuel-air ratio in the regulation of the intake air amount by the IGV 14v and the amount of change in the fuel-air ratio in the regulation of the flow rate of the return air Ab by the return air regulating valve 18v becomes a predetermined ratio.

As described above, in a case where the intake air control step S4c and the return air control step S5c are executed in parallel and the gas turbine efficiency is prioritized, it is preferable that the predetermined ratio is determined such that the amount of increase in the fuel-air ratio in the execution of only the intake air control step S4c becomes larger than the amount of increase in the fuel-air ratio in the execution of only the return air control step S5c. Further, in a case where a decrease in unburned content concentration is prioritized, it is preferable that the predetermined ratio is determined such that the amount of increase in the fuel-air ratio in the execution of only the return air control step S5c becomes larger than the amount of increase in the fuel-air ratio in the execution of only the intake air control step S4c. The predetermined ratio is stored in the cooperation controller 56 from the outside, and the cooperation controller 56 performs cooperation control by using the predetermined ratio.

Further, as described above, the sensitivity of changes in the NOx concentration and the unburned content concentration with respect to a change in intake air amount is different from the sensitivity of changes in the NOx concentration and the unburned content concentration with respect to a change in return air amount. Therefore, in a case where the intake air control step S4c and the return air control step S5c are executed in parallel, for example, if the opening degree of the return air regulating valve 18v is increased while increasing the IGV opening degree and the ratio between these operation amounts is set appropriately, it is also possible to reduce the unburned content concentration while keeping the NOx concentration constant. In this manner, by controlling the cooperation between the operation of the IGV 14v and the operation of the return air regulating valve 18v, it is possible to change the abundance ratio of the NOx and the unburned content in the exhaust gas, and to make the properties of the exhaust gas advantageous for denitration.

Fifth Embodiment

Figure 15:
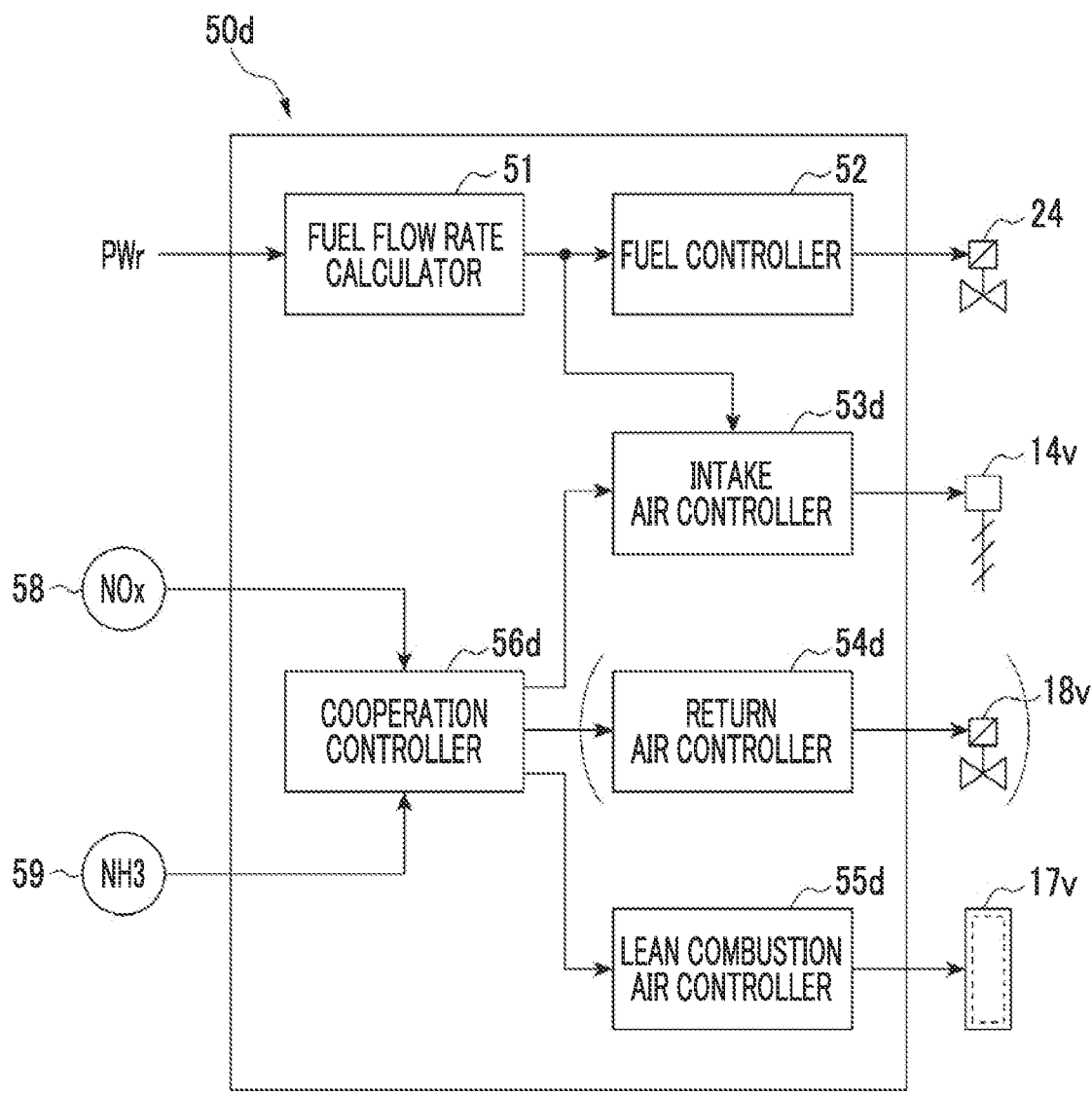
FIG. 15 is a functional block diagram of a control device in a fifth embodiment according to the present disclosure.
Figure 16:
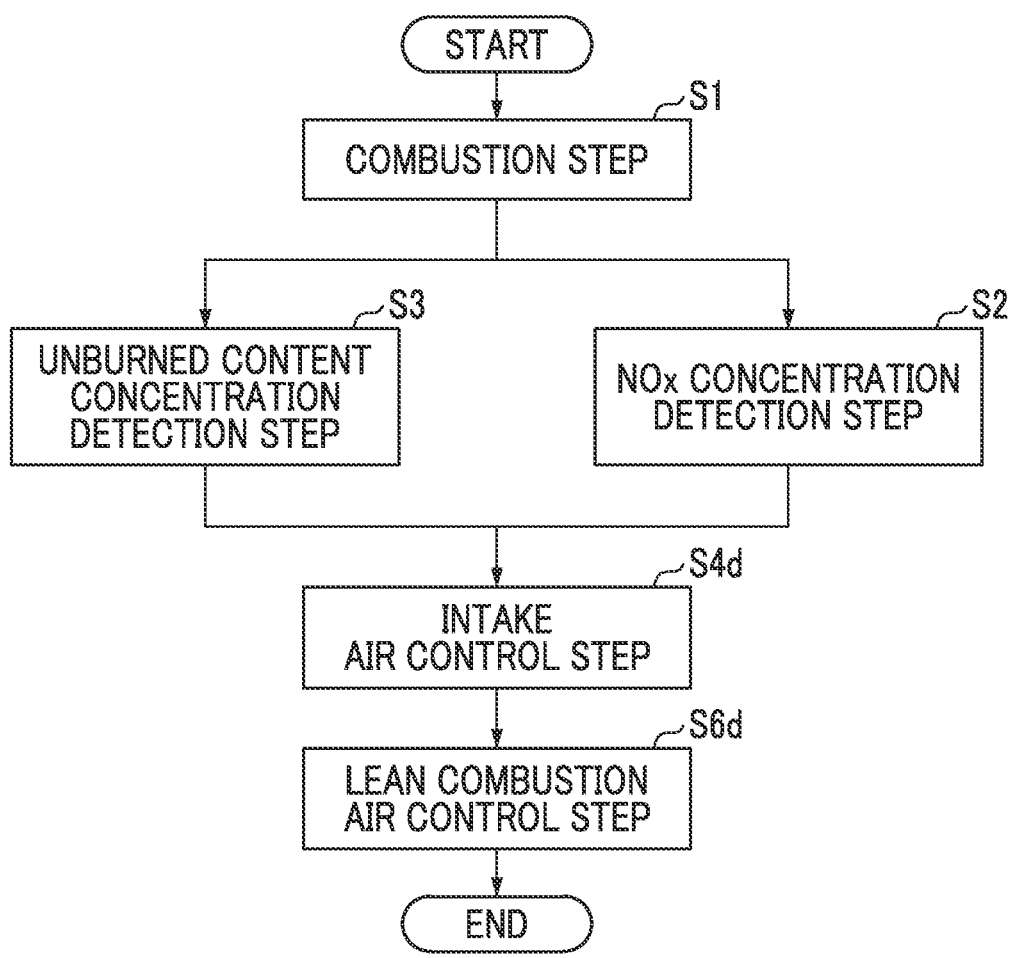
FIG. 16 is a flowchart showing a procedure in a gas turbine control method in the fifth embodiment according to the present disclosure.
Figure 17:
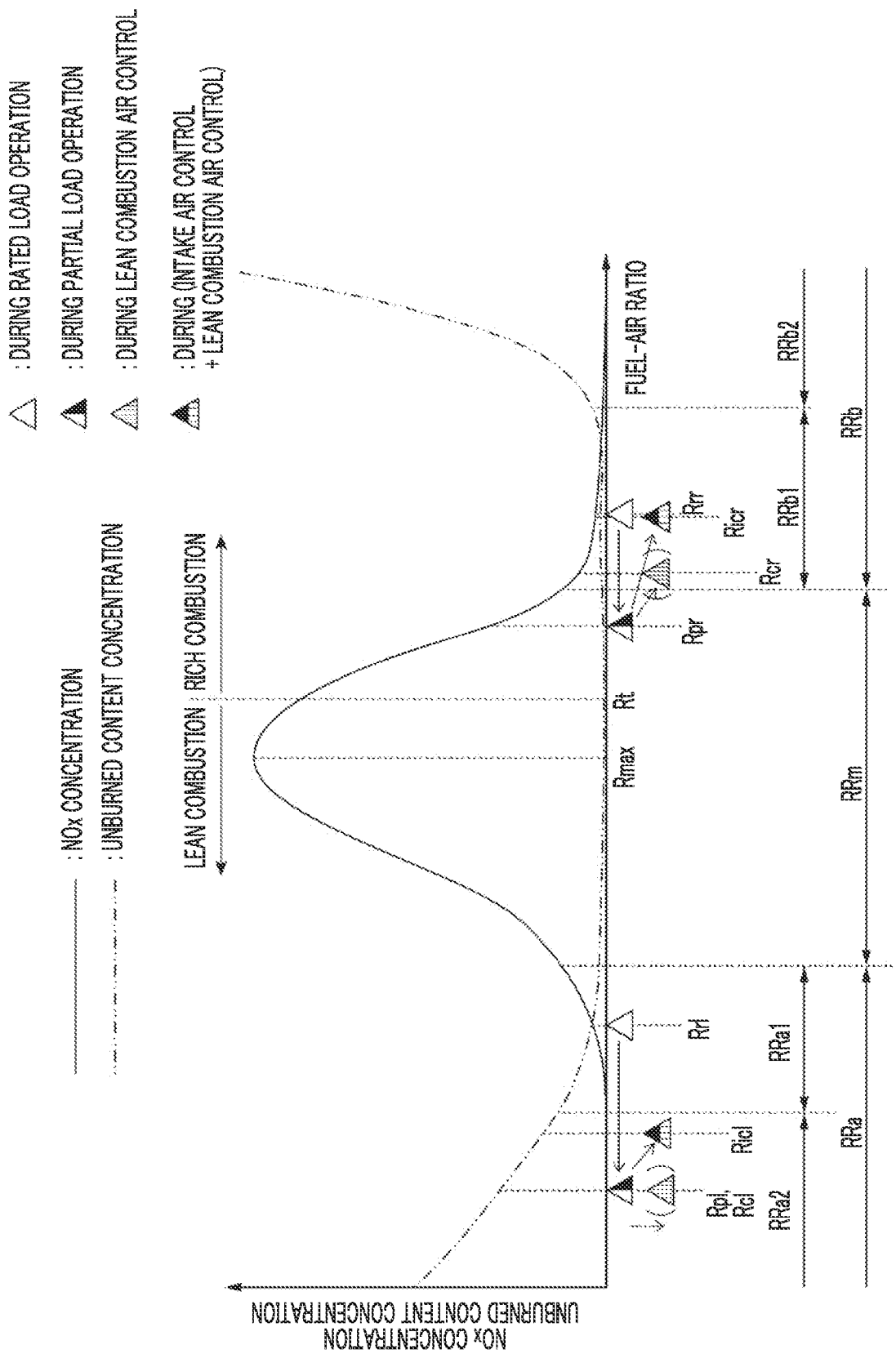
FIG. 17 is a graph showing the relationship between a fuel-air ratio, NOx concentration, and unburned content concentration in various operation modes in the fifth embodiment according to the present disclosure.

Hereinafter, a fifth embodiment of the gas turbine equipment according to the present disclosure will be described using FIGS. 15 to 17.

The gas turbine equipment of the present embodiment includes the gas turbine 10, the compressed air return device 18, the denitration device 28, the chimney 29, the fuel supply equipment 20, and a control device 50d, as in the first embodiment. However, as shown in FIG. 15, the control device 50d of the present embodiment is different from the control device 50 of the first embodiment.

The control device 50d of the present embodiment has the fuel flow rate calculator 51 and the fuel controller 52, as in the control device 50 of the first embodiment. The control device 50d of the present embodiment further includes a dilution air controller 55d, a cooperation controller 56d, and an intake air controller 53d different from the intake air controller 53 of the first embodiment.

The intake air controller 53d of the present embodiment controls the IGV 14v according to the fuel flow rate from the fuel flow rate calculator 51, as in the intake air controller 53 of the first embodiment. Further, the intake air controller 53d of the present embodiment controls the IGV 14v according to an instruction from the cooperation controller 56d. The dilution air controller 55d controls the dilution air regulating valve 17v according to an instruction from the cooperation controller 56d. The cooperation controller 56d causes the operation control of the IGV 14v by the intake air controller 53d and the operation control of the dilution air regulating valve 17v by the dilution air controller 55d to cooperate with each other according to the NOx concentration detected by the NOx concentration meter 58 and the unburned content concentration detected by the unburned content concentration meter 59.

Next, the procedure for executing the control method for the gas turbine 10 in the present embodiment will be described according to the flowchart shown in FIG. 16.

First, as in the first embodiment, the combustion step S1 is executed. Further, during the execution of the combustion step S1, the NOx concentration detection step S2 and the unburned content concentration detection step S3 are executed, as in the first embodiment.

The cooperation controller 56d instructs the intake air controller 53d to control the IGV 14v and the dilution air controller 55d to control the dilution air regulating valve 17v according to the NOx concentration detected by the NOx concentration meter 58. Specifically, for example, the cooperation controller 56d determines whether or not the NOx concentration detected by the NOx concentration meter 58 has become equal to or higher than a predetermined value.

Then, when it is determined that the NOx concentration detected by the NOx concentration meter 58 has become equal to or higher than a predetermined value, the cooperation controller 56d instructs the intake air controller 53d to control the IGV 14v and instructs the dilution air controller 55d to control the dilution air regulating valve 17v.

Here, when the NOx concentration detected by the NOx concentration meter 58 has become equal to or higher than a predetermined value, it is assumed that the intake air control step is not executed and only the dilution air control step is executed as in the third embodiment. In this case, as described above, as described above using FIG. 11, the fuel-air ratio Rcl in the lean combustion area LA is not different from the fuel-air ratio Rpl in the lean combustion area LA during the simple partial load operation described above.

Therefore, in the present embodiment, the cooperation controller 56d controls the cooperation between the control of the dilution air regulating valve 17v by the dilution air controller 55d and the control of the IGV 14v by the intake air controller 53d such that the NOx concentration becomes lower than a predetermined value and the unburned content concentration in the gas flowing out from the lean combustion area LA does not increase and falls within a predetermined unburned content concentration range. Specifically, the cooperation controller 56d increases the flow rate of the dilution air Al with the control of the dilution air regulating valve 17v by the dilution air controller 55d while reducing the intake air amount with the control of the IGV 14v by the intake air controller 53d, such that the fuel-air ratio in the lean combustion area LA does not change and the fuel-air ratio in the rich combustion area increases.

The intake air controller 53d and the dilution air controller 55d are operated by the instructions from the cooperation controller 56d as described above to the intake air controller 53d and the dilution air controller 55d, and an intake air control step S4d and a dilution air control step S6d are executed.

When the NOx concentration detected by the NOx concentration meter 58 has become equal to or higher than a predetermined value, if the intake air control step S4d and the dilution air control step S6d are executed, the intake air amount is reduced by a predetermined amount, and the flow rate of the dilution air Al is increased by a predetermined amount. As a result, as shown in FIG. 17, even during the partial load operation, a fuel-air ratio Ricr in the rich combustion area RA becomes larger than the fuel-air ratio Rpr in the rich combustion area RA during the above-described simple partial load operation by a predetermined amount, and is located within the region RRb1 having a small fuel-air ratio in the large fuel-air ratio region RRb. Therefore, the intake air amount and the flow rate of the dilution air Al are controlled as described above during the partial load operation, so that even during the partial load operation, the NOx concentration in the gas flowing out from the rich combustion area RA can be kept extremely low and the unburned content concentration in the gas flowing out from the rich combustion area RA can fall within a predetermined unburned content concentration range. Further, even during the partial load operation, a fuel-air ratio Rlcl in the lean combustion area LA becomes larger than the fuel-air ratio Rcl in the lean combustion area LA in a case where only the dilution air control step S6d is executed, by a predetermined amount. Therefore, the intake air amount and the flow rate of the dilution air Al are controlled as described above during the partial load operation, so that even during the partial load operation, the NOx concentration in the gas flowing out from the lean combustion area LA can be kept extremely low and the unburned content concentration in the gas flowing out from the lean combustion area LA can fall within a predetermined unburned content concentration range.

Therefore, in the present embodiment, even during the partial load operation, the NOx concentration in the exhaust gas that is exhausted from the gas turbine 10 can be kept extremely low, and the unburned content concentration in the exhaust gas can fall within a predetermined unburned content concentration range.

As described above, the cooperation controller 56d of the present embodiment causes the operation control of the IGV 14v by the intake air controller 53d and the operation control of the dilution air regulating valve 17v by the dilution air controller 55d to cooperate with each other. However, the cooperation controller 56d may cause the operation control of the return air regulating valve 18v by the return air controller 54d and the operation control of the dilution air regulating valve 17v by the dilution air controller 55d to cooperate with each other.

In this case, the cooperation controller 56d controls the cooperation between the operation control of the IGV 14v by the intake air controller 53d and the control of the dilution air regulating valve 17v by the dilution air controller 55d such that the NOx concentration becomes lower than a predetermined value and the unburned content concentration in the gas flowing out from the lean combustion area LA does not increase and falls within a predetermined unburned content concentration range. Specifically, the cooperation controller 56d increases the flow rate of the dilution air Al with the control of the dilution air regulating valve 17v by the dilution air controller 55d while increasing the flow rate of the return air Ab with the control of the return air regulating valve 18v by the return air controller 54d, such that the fuel-air ratio in the lean combustion area LA does not change and the fuel-air ratio in the rich combustion area increases.

Sixth Embodiment

Figure 18:
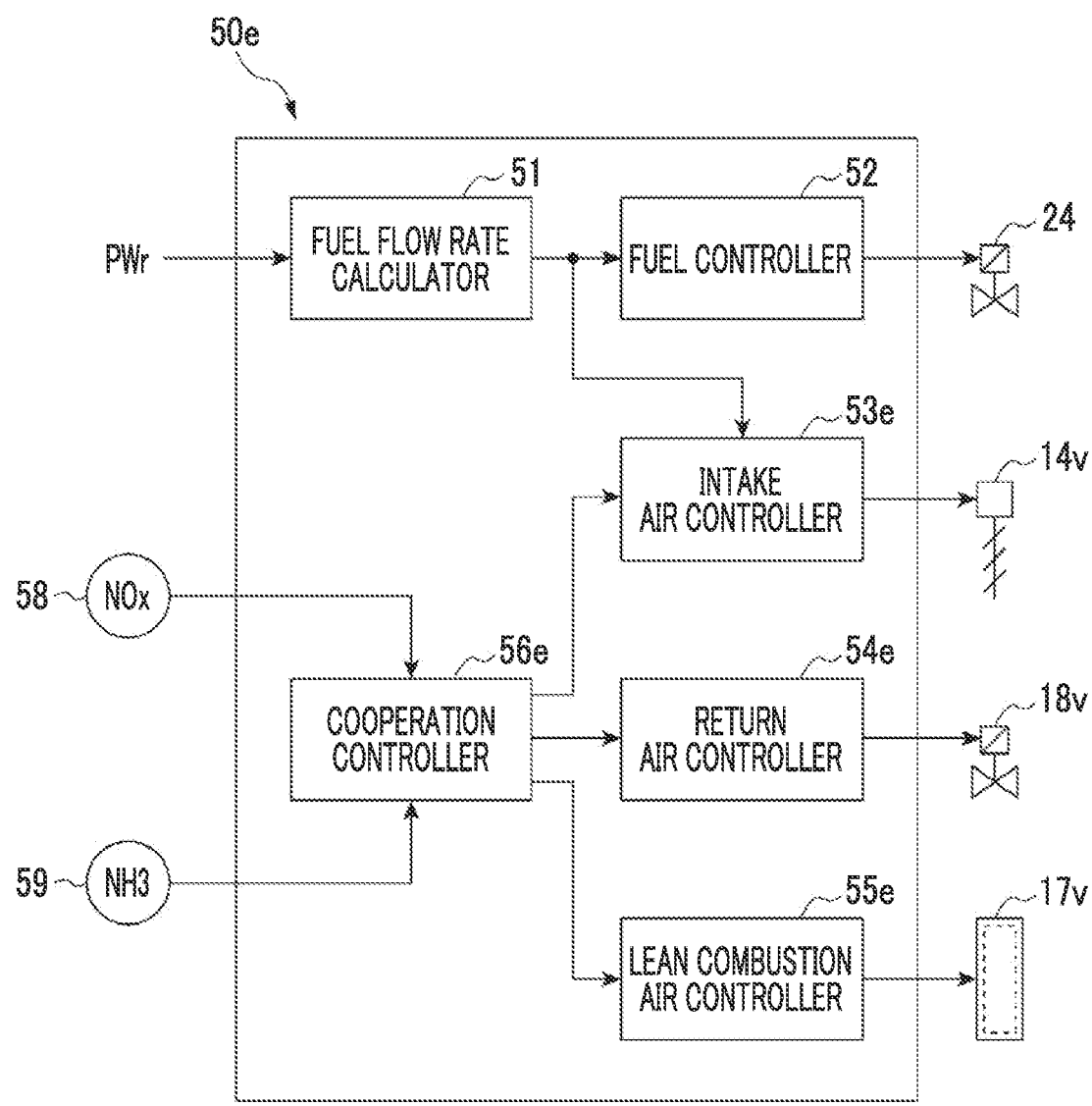
FIG. 18 is a functional block diagram of a control device in a sixth embodiment according to the present disclosure.
Figure 19:
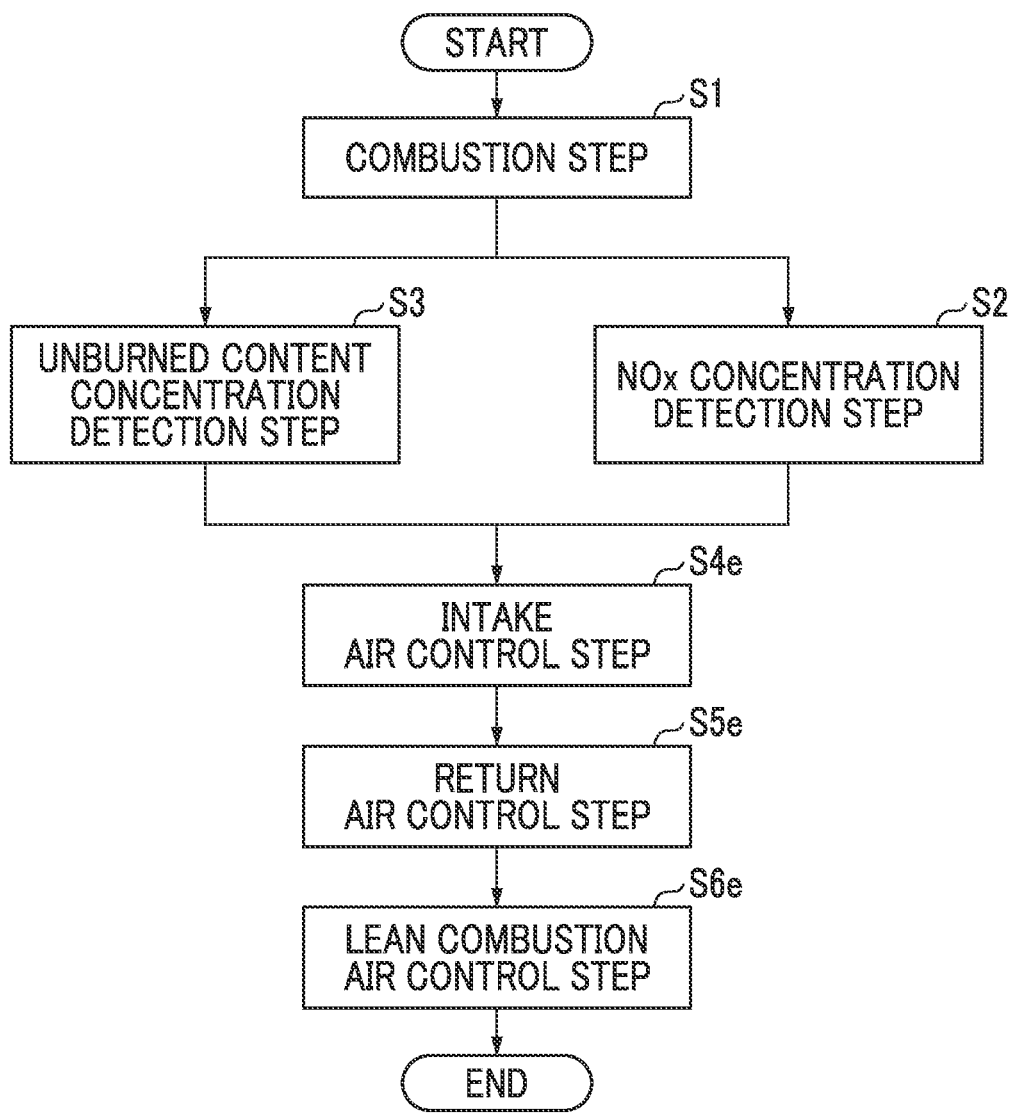
FIG. 19 is a flowchart showing a procedure in a gas turbine control method in the sixth embodiment according to the present disclosure.
Figure 20:
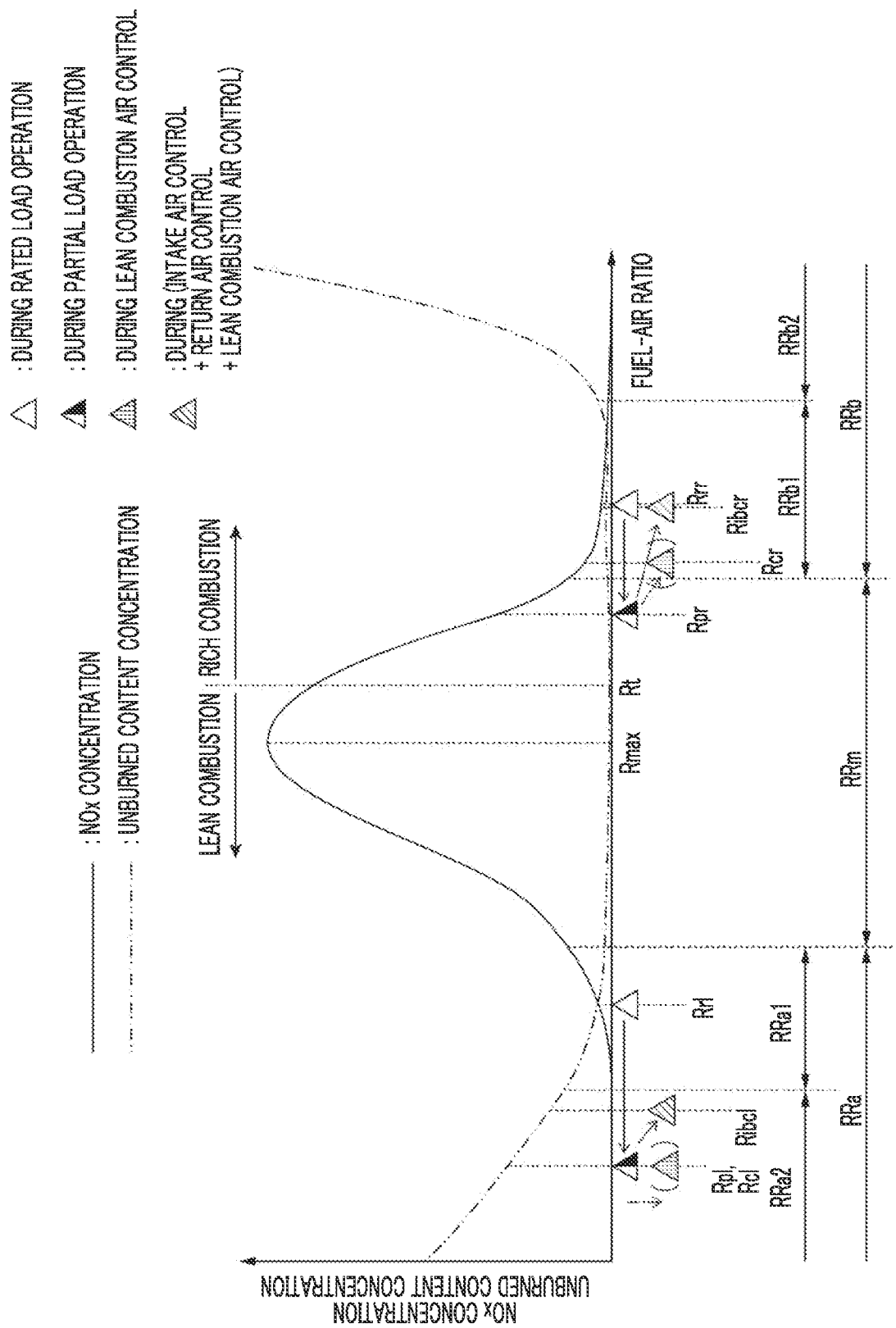
FIG. 20 is a graph showing the relationship between a fuel-air ratio, NOx concentration, and unburned content concentration in various operation modes in the sixth embodiment according to the present disclosure.

Hereinafter, a sixth embodiment of the gas turbine equipment according to the present disclosure will be described using FIGS. 18 to 20.

The gas turbine equipment of the present embodiment includes the gas turbine 10, the compressed air return device 18, the denitration device 28, the chimney 29, the fuel supply equipment 20, and a control device 50e, as in the first embodiment. However, as shown in FIG. 18, the control device 50e of the present embodiment is different from the control device 50 of the first embodiment.

The control device 50e of the present embodiment has the fuel flow rate calculator 51 and the fuel controller 52, as in the control device 50 of the first embodiment. The control device 50e of the present embodiment further includes a return air controller 54e, a dilution air controller 55e, a cooperation controller 56e, and an intake air controller 53e different from the intake air controller 53 of the first embodiment.

The intake air controller 53e of the present embodiment controls the IGV 14v according to the fuel flow rate from the fuel flow rate calculator 51, as in the intake air controller 53 of the first embodiment. Further, the intake air controller 53e of the present embodiment controls the IGV 14v according to an instruction from the cooperation controller 56e. The return air controller 54e controls the return air regulating valve 18v according to an instruction from the cooperation controller 56e. The dilution air controller 55e controls the dilution air regulating valve 17v according to an instruction from the cooperation controller 56e. The cooperation controller 56e causes the operation control of the IGV 14v by the intake air controller 53e, the operation control of the return air regulating valve 18v by the return air controller 54e, and the operation control of the dilution air regulating valve 17v by the dilution air controller 55e to cooperate with each other according to the NOx concentration detected by the NOx concentration meter 58 and the unburned content concentration detected by the unburned content concentration meter 59.

Next, the procedure for executing the control method for the gas turbine 10 in the present embodiment will be described according to the flowchart shown in FIG. 19.

First, as in the first embodiment, the combustion step S1 is executed. Further, during the execution of the combustion step S1, the NOx concentration detection step S2 and the unburned content concentration detection step S3 are executed, as in the first embodiment.

The cooperation controller 56e instructs the intake air controller 53e to control the IGV 14v, the return air controller 54e to control the return air regulating valve 18v, and the dilution air controller 55e to control the dilution air regulating valve 17v, according to the NOx concentration detected by the NOx concentration meter 58. Specifically, for example, the cooperation controller 56e determines whether or not the NOx concentration detected by the NOx concentration meter 58 has become equal to or higher than a predetermined value. Then, when it is determined that the NOx concentration detected by the NOx concentration meter 58 has become equal to or higher than a predetermined value, the cooperation controller 56e instructs the intake air controller 53e to control the IGV 14v, the return air controller 54e to control the return air regulating valve 18v, and the dilution air controller 55e to control the dilution air regulating valve 17v.

As a result, an intake air control step S4e by the intake air controller 53e, a return air control step S5e by the return air controller 54e, and a dilution air control step S6e by the dilution air controller 55e are executed.

In this case, as in the fourth embodiment described above, the cooperation controller 56e controls the cooperation between the control of the IGV 14v by the intake air controller 53e and the control of the return air regulating valve 18v by the return air controller 54e. Therefore, also in this case, the return air control step S5e may be executed after the intake air control step S4e is executed, or the intake air control step S4e and the return air control step S5e may be executed in parallel. Further, in this case, the cooperation controller 56e controls the cooperation of the dilution air regulating valve 17v by the dilution air controller 55e with the control of the IGV 14v by the intake air controller 53e and the control of the return air regulating valve 18v by the return air controller 54e, as in the fifth embodiment described above.

When the NOx concentration detected by the NOx concentration meter 58 has become equal to or higher than a predetermined value, if the intake air control step S4e, the return air control step S5e, and the dilution air control step S6e are executed, the intake air amount is reduced by a predetermined amount, the flow rate of the return air Ab is increased by a predetermined amount, and the flow rate of the dilution air Al is increased by a predetermined amount. As a result, as shown in FIG. 20, even during the partial load operation, a fuel-air ratio Ribcr in the rich combustion area RA becomes larger than the fuel-air ratio Rpr in the rich combustion area RA during the simple partial load operation described above by a predetermined amount, and is located within the region RRb1 having a small fuel-air ratio in the large fuel-air ratio region RRb. Therefore, the intake air amount, the flow rate of the return air Ab, and the flow rate of the dilution air Al are controlled as described above during the partial load operation, so that even during the partial load operation, the NOx concentration in the gas flowing out from the rich combustion area RA can be kept extremely low and the unburned content concentration in the gas flowing out from the rich combustion area RA can fall within a predetermined unburned content concentration range. Further, even during the partial load operation, a fuel-air ratio Ribcl in the lean combustion area LA becomes larger than the fuel-air ratio Rcl in the lean combustion area LA in a case where only the dilution air control step is executed, by a predetermined amount. Therefore, the intake air amount, the flow rate of the return air Ab, and the flow rate of the dilution air Al are controlled as described above during the partial load operation, so that even during the partial load operation, the NOx concentration in the gas flowing out from the lean combustion area LA can be kept extremely low and the unburned content concentration in the gas flowing out from the lean combustion area LA can be kept low and fall within a predetermined unburned content concentration range.

Therefore, in the present embodiment, even during the partial load operation, the NOx concentration in the exhaust gas that is exhausted from the gas turbine 10 can be kept extremely low, and the unburned content concentration in the exhaust gas can fall within a predetermined unburned content concentration range.

Modification Examples

The NOx concentration meter 58 in each of the embodiments described above detects the concentration of NOx contained in the exhaust gas exhausted from the gas turbine 10 and before flowing into the denitration device 28. Further, the unburned content concentration meter 59 detects the concentration of ammonia which is an unburned content contained in the exhaust gas exhausted from the gas turbine 10 and before flowing into the denitration device 28. However, the NOx concentration meter 58 may detect the concentration of NOx contained in the exhaust gas exhausted from the denitration device 28. Further, the unburned content concentration meter 59 may detect the concentration of ammonia which is an unburned content contained in the exhaust gas exhausted from the denitration device 28.

The combustion chamber forming device 15c in each of the embodiments described above may have a plurality of openings 15o. In this case, it is favorable if the dilution air regulating device 17 is connected to at least one opening 15o among the plurality of openings 15o.

The dilution air regulating device 17 in each of the embodiments described above has the dilution air regulating valve 17v and the dilution air line 17p. However, the dilution air regulating device 17 does not need to be provided with the dilution air line 17p. In this case, the valve casing 17vc of the dilution air regulating valve 17v is directly connected to the combustion chamber forming device 15c.

The gas turbine equipment in each of the embodiments described above includes the compressed air return device 18 and the dilution air regulating device 17. However, in the gas turbine equipment in the embodiment in which the return air control step is not executed, among the embodiments described above, the compressed air return device 18 may be omitted. Further, in the gas turbine equipment in the embodiment in which the dilution air control step is not executed, among the embodiments described above, the dilution air regulating device 17 may be omitted.

Although the embodiments and modification examples of the present disclosure have been described in detail above, the present disclosure is not limited to the above embodiments and modification examples. Various additions, changes, replacements, partial deletions, or the like can be made within a scope which does not depart from the conceptual idea and gist of the present invention which are derived from the contents defined in the claims and equivalents thereof.

Additional Remarks

The gas turbine equipment in each of the embodiments described above is understood as follows, for example.

(1) Gas turbine equipment in a first aspect includes
the gas turbine 10, the NOx concentration meter 58 that detects the NOx concentration in the exhaust gas which is the combustion gas exhausted from the gas turbine 10, and the control device 50, 50c, 50d, or 50e. The gas turbine 10 includes the compressor 14 capable of compressing air to generate compressed air, the combustor 15 capable of burning ammonia as fuel in the compressed air to generate a combustion gas, and the turbine 16 capable of being driven by the combustion gas. The compressor 14 includes the compressor rotor 14r rotatable with the axis Ar as a center, the compressor casing 14c that covers the compressor rotor 14r, and the intake air adjuster 14v that adjusts an intake air amount that is a flow rate of air that is sucked into the compressor casing 14c. The combustor 15 includes the combustion chamber forming device 15c that forms the combustion chamber 15s in which the fuel is burned and which is capable of leading the combustion gas generated by combustion of the fuel to the turbine 16, and the combustor main body 15b capable of injecting the ammonia and the main combustion air Am, which is part of the compressed air, into the combustion chamber 15s. The combustion chamber forming device 15c is formed with the opening 15o through which the dilution air Al, which is part of the compressed air, is capable of being introduced into the combustion chamber 15s from outside the combustion chamber forming device 15c. The combustor 15 is configured such that the rich combustion area RA in which fuel from the combustor main body 15b is burned in a fuel-air ratio, which is a ratio of fuel to air, larger than a stoichiometric fuel-air ratio, and the lean combustion area LA in which a gas from the rich combustion area RA is diluted with the dilution air Al from the opening 15o and fuel contained in the gas after being diluted with the dilution air Al is burned in a fuel-air ratio smaller than the stoichiometric fuel-air ratio are formed in the combustion chamber 15s. The control device 50, 50c, 50d, or 50e includes the intake air controller 53, 53c, 53d, or 53e that controls the operation of the intake air adjuster 14v such that the intake air amount is reduced, according to the NOx concentration in the exhaust gas detected by the NOx concentration meter 58.

The amount of NOx generated changes according to the fuel-air ratio in a combustion area of fuel. The combustor 15 of this aspect is a combustor in which the rich combustion area RA and the lean combustion area LA are formed in the combustion chamber 15s. Therefore, the combustor 15 of this aspect is a combustor that adopts the RQL (rich burn-quick quench-lean burn) method. Further, the combustor 15 of this aspect uses ammonia as fuel. In such a combustor 15, during a process in which the gas turbine 10 is transitioned from the rated load operation to the partial load operation, and when the gas turbine 10 is operating at a partial load (hereinafter referred to as a partial load operation) or the like, a combustion chamber fuel-air ratio, which is the ratio of the total fuel flow rate that is injected into the combustion chamber 15s to the total combustion air flowing into the combustion chamber 15s, becomes smaller than that during the rated load operation. The amount of NOx generated in the combustor 15 changes according to the fuel-air ratio in a combustion area of fuel, not only in the combustor 15 that adopts the RQL method. In the combustor 15 that adopts the RQL method and uses ammonia as fuel, during the partial load operation, the fuel-air ratios in both the rich combustion area RA and the lean combustion area LA decrease, and the NOx concentration in the combustion gas of the combustor 15 that is discharged from the combustor 15 increases.

In this aspect, when the NOx concentration in the exhaust gas becomes equal to or higher than a predetermined value, the intake air controller 53, 53c, 53d, or 53e controls the operation of the intake air adjuster 14v such that the intake air amount is reduced. In the combustor 15 of this aspect that adopts the RQL method, when the intake air amount is small, both the fuel-air ratios in the rich combustion area RA and the lean combustion area LA are increased. As a result, in this aspect, the emission amount of NOx can be suppressed.

(2) In gas turbine equipment in a second aspect,
the gas turbine equipment in the first aspect further includes the unburned content concentration meter 59 that detects unburned content concentration in the exhaust gas, in which the intake air controller 53, 53c, 53d, or 53e controls the operation of the intake air adjuster 14v such that the NOx concentration in the exhaust gas becomes lower than a predetermined value and the unburned content concentration in the exhaust gas falls within a predetermined unburned content concentration range determined according to the NOx concentration.

The amount of the unburned content remaining in the combustor 15 changes according to the fuel-air ratio in the combustion area of the fuel, not only in the combustor 15 that adopts the RQL method. In the combustor 15 that adopts the RQL method and uses ammonia as fuel, during the partial load operation, as described above, both the fuel-air ratios in the rich combustion area RA and the lean combustion area LA become small, and the unburned content concentration in the combustion gas of the combustor 15 that is discharged from the combustor 15 increases.

In this aspect, when the NOx concentration in the exhaust gas becomes equal to or higher than a predetermined value, the intake air controller 53, 53c, 53d, or 53e controls the operation of the intake air adjuster 14v such that the intake air amount is reduced. In the combustor 15 of this aspect that adopts the RQL method, when the intake air amount is small, both the fuel-air ratios in the rich combustion area RA and the lean combustion area LA are increased. As a result, in this aspect, it is possible to suppress the emission amount of the unburned content, and it is possible to make the unburned content concentration in the exhaust gas a predetermined unburned content concentration. That is, in this aspect, it is possible to suppress the emission amount of the unburned content while suppressing the NOx concentration, and to make the unburned content concentration in the exhaust gas be within a predetermined unburned content concentration range.

(3) In gas turbine equipment in a third aspect,
the gas turbine equipment in the first or second aspect further includes the air return line 18p capable of returning part of the compressed air discharged from the compressor casing 14c back into the compressor casing 14c, and the return air regulating valve 18v capable of regulating the flow rate of the return air Ab, which is the compressed air flowing through the air return line 18p. The control device 50c, 50d, or 50e includes the return air controller 54c, 54d, or 54e that controls the operation of the return air regulating valve 18v, and the cooperation controller 56, 56d, or 56e that causes the control of the intake air adjuster 14v by the intake air controller 53c, 53d, or 53e and the control of the return air regulating valve 18v by the return air controller 54c, 54d, or 54e to cooperate with each other. The cooperation controller 56, 56d, or 56e causes the return air controller 54c, 54d, or 54e to control the return air regulating valve 18v such that the flow rate of the return air Ab is increased, according to the NOx concentration in the exhaust gas detected by the NOx concentration meter 58.

When the flow rate of the return air Ab increases, both the fuel-air ratios in the rich combustion area RA and the lean combustion area LA increase. As a result, in this aspect, the emission amount of NOx can be suppressed.

(4) In gas turbine equipment in a fourth aspect,
the gas turbine equipment in the second aspect further includes the air return line 18p capable of returning part of the compressed air discharged from the compressor casing 14c back into the compressor casing 14c, and the return air regulating valve 18v capable of regulating the flow rate of the return air Ab, which is the compressed air flowing through the air return line 18p. The control device 50c, 50d, or 50e includes the return air controller 54c, 54d, or 54e that controls the operation of the return air regulating valve 18v, and the cooperation controller 56, 56d, or 56e that causes the control of the intake air adjuster 14v by the intake air controller 53c, 53d, or 53e and the control of the return air regulating valve 18v by the return air controller 54c, 54d, or 54e to cooperate with each other. The cooperation controller 56, 56d, or 56e causes the intake air controller 53c, 53d, or 53e to control the intake air adjuster 14v and the return air controller 54c, 54d, or 54e to control the return air regulating valve 18v such that the NOx concentration in the exhaust gas becomes lower than a predetermined value and the unburned content concentration in the exhaust gas falls within a predetermined unburned content concentration range determined according to the NOx concentration.

In this aspect, it is possible to suppress the emission amount of the unburned content while suppressing the NOx concentration, and to make the unburned content concentration in the exhaust gas be within a predetermined unburned content concentration range.

(5) In gas turbine equipment in a fifth aspect, in the gas turbine equipment in the fourth aspect, the cooperation controller 56, 56d, or 56e causes the return air controller 54c, 54d, or 54e to regulate the flow rate of the return air Ab such that the return air Ab by the return air regulating valve 18v is increased, in any one of a first case, a second case, and a third case, after causing the intake air controller 53c, 53d, or 53e to control the intake air adjuster 14v such that the NOx concentration in the exhaust gas becomes lower than the predetermined value. The first case is a case where the unburned content concentration in the exhaust gas does not fall within the unburned content concentration range. The second case is a case of receiving a request to further reduce the unburned content concentration in the exhaust gas. The third case is a case where a fuel-air ratio is not increased by a predetermined amount only by the operation of the intake air adjuster 14v.

Even if the intake air adjuster 14v is controlled by the intake air controller 53c, 53d, or 53e and even if the return air regulating valve 18v is controlled by the return air controller 54c, 54d, or 54e, it is possible to change the fuel-air ratio in each combustion area. Therefore, if any one of the control of the intake air adjuster 14v by the intake air controller 53c, 53d, or 53e and the control of the return air regulating valve 18v by the return air controller 54c, 54d, or 54e is executed, it is possible to regulate the NOx concentration and the unburned content concentration. However, if the flow rate of the return air Ab is increased with the control of the return air regulating valve 18v by the return air controller 54c, 54d, or 54e, due to an increase in the flow rate of the return air Ab, a load on the compressor 14 increases. Therefore, in a case where the control of the return air regulating valve 18v by the return air controller 54c, 54d, or 54e is executed, the gas turbine efficiency becomes lower than that in a case where the control of the intake air adjuster 14v by the intake air controller 53c, 53d, or 53e is executed. Further, if the flow rate of the return air Ab is increased with the control of the return air regulating valve 18v by the return air controller 54c, 54d, or 54e, the temperature of the compressed air flowing into the combustor 15 becomes higher than that in a case where the control of the intake air adjuster 14v by the intake air controller 53c, 53d, or 53e is executed. Therefore, when the control of the return air regulating valve 18v by the return air controller 54c, 54d, or 54e is executed, the combustibility of the fuel becomes higher and the unburned content concentration becomes lower than that in a case where the control of the return air regulating valve 18v by the return air controller 54c, 54d, or 54e is executed.

Therefore, in a case where the gas turbine efficiency is prioritized, it is preferable to execute control of the intake air adjuster 14v by the intake air controller 53c, 53d, or 53e, and in a case where a decrease in unburned content concentration is prioritized, it is preferable to execute control of the return air regulating valve 18v by the return air controller 54c, 54d, or 54e.

Therefore, in this aspect, in order to suppress a decrease in gas turbine efficiency while reducing the NOx concentration, first, the control of the intake air adjuster 14v by the intake air controller 53c, 53d, or 53e is executed. Then, after this control, in the first case or the second case, the control of the return air regulating valve 18v by the return air controller 54c, 54d, or 54e is executed in order to effectively reduce the unburned content concentration.

(6) In gas turbine equipment in a sixth aspect, in the gas turbine equipment in the third or fourth aspect, the cooperation controller 56, 56d, or 56e causes the intake air controller 53c, 53d, or 53e to control the intake air adjuster 14v and the return air controller 54c, 54d, or 54e to control the return air regulating valve 18v such that the ratio between the amount of change in fuel-air ratio in regulation of the intake air amount by the intake air adjuster 14v and the amount of change in fuel-air ratio in regulation of the flow rate of the return air Ab by the return air regulating valve 18v becomes a predetermined ratio.

As described above, in a case where the gas turbine efficiency is prioritized, it is preferable to execute the control of the intake air adjuster 14v by the intake air controller 53, 53a, 53c, 53d, or 53e, and in a case where a decrease in unburned content concentration is prioritized, it is preferable to execute the control of the return air regulating valve 18v by the return air controller 54, 54c, 54d, or 54e. Therefore, by appropriately setting the predetermined ratio in this aspect, it becomes possible to give priority to the gas turbine efficiency and to give priority to a decrease in unburned content concentration.

(7) In gas turbine equipment in a seventh aspect, the gas turbine equipment in any one of the first to sixth aspects further includes the dilution air regulating valve 17v that regulates the flow rate of the dilution air Al that is introduced into the combustion chamber 15s from the opening 15o. The control device 50d or 50e includes the dilution air controller 55d or 55e that controls the operation of the dilution air regulating valve 17v, and the cooperation controller 56d or 56e that causes the control of the intake air adjuster 14v by the intake air controller 53d or 53e and the control of the dilution air regulating valve 17v by the dilution air controller 55d or 55e to cooperate with each other. The cooperation controller 56d or 56e causes the dilution air controller 55d or 55e to control the dilution air regulating valve 17v such that the flow rate of the dilution air Al is increased, according to the NOx concentration in the exhaust gas detected by the NOx concentration meter 58.

In this aspect, when the flow rate of the dilution air Al flowing into the combustion chamber 15s of the combustor 15 adopting the RQL method is increased with the control of the dilution air regulating valve 17v by the dilution air controller 55d or 55e, the flow rate of the main combustion air Am that is injected from the combustor main body 15b into the combustion chamber 15s is reduced. Therefore, in this aspect, when the NOx concentration in the exhaust gas becomes equal to or higher than a predetermined value, the fuel-air ratio in the lean combustion area LA does not change and the fuel-air ratio in the rich combustion area RA is increased. As a result, in this aspect, the emission amount of NOx can be suppressed.

(8) In gas turbine equipment in an eighth aspect, in the gas turbine equipment in the seventh aspect, the cooperation controller 56d or 56e increases the flow rate of the dilution air Al via the control of the dilution air regulating valve 17v by the dilution air controller 55d or 55e while reducing the intake air amount via the control of the intake air adjuster 14v by the intake air controller 53d or 53e such that a fuel-air ratio in the lean combustion area LA does not change and a fuel-air ratio in the rich combustion area RA is increased.

In the combustor 15 adopting the RQL method, when the fuel-air ratio in the lean combustion area LA becomes smaller than a predetermined value, the unburned content in the lean combustion area LA increases. In this aspect, since the fuel-air ratio in the lean combustion area LA does not change, it is possible to suppress an increase in the unburned content concentration in the exhaust gas.

(9) In gas turbine equipment in a ninth aspect,
the gas turbine equipment in any one of the third to sixth aspects further includes the dilution air regulating valve 17v that regulates the flow rate of the dilution air Al that is introduced into the combustion chamber 15s from the opening 15o. The control device 50e includes the dilution air controller 55e that controls the operation of the dilution air regulating valve 17v. The cooperation controller 56e causes the control of the intake air adjuster 14v by the intake air controller 53e, the control of the return air regulating valve 18v by the return air controller 54e, and the control of the dilution air regulating valve 17v by the dilution air controller 55e to cooperate with each other. The cooperation controller 56e causes the dilution air controller 55e to control the dilution air regulating valve 17v such that the flow rate of the dilution air Al is increased, according to the NOx concentration in the exhaust gas detected by the NOx concentration meter 58.

In this aspect, when the flow rate of the dilution air Al flowing into the combustion chamber 15s of the combustor 15 adopting the RQL method is increased with the control of the dilution air regulating valve 17v by the dilution air controller 55e, the flow rate of the main combustion air Am that is injected into the combustion chamber 15s from the combustor main body 15b is reduced. Therefore, in this aspect, when the NOx concentration in the exhaust gas becomes equal to or higher than a predetermined value, the fuel-air ratio in the lean combustion area LA is reduced, and the fuel-air ratio in the rich combustion area RA is increased. As a result, in this aspect, the emission amount of NOx can be suppressed.

(10) In gas turbine equipment in a tenth aspect,
in the gas turbine equipment in the ninth aspect, the cooperation controller 56e causes the intake air controller 53e, the return air controller 54e, and the dilution air controller 55e to reduce the intake air amount by the intake air adjuster 14v, increase the flow rate of the return air Ab by the return air regulating valve 18v, and increase the flow rate of the dilution air Al by the dilution air regulating valve 17v, such that a fuel-air ratio in the lean combustion area LA does not change and a fuel-air ratio in the rich combustion area RA is increased.

(11) Gas turbine equipment in an eleventh aspect includes the gas turbine 10, the air return line 18p, the return air regulating valve 18v, the NOx concentration meter 58 that detects the NOx concentration in the exhaust gas which is the combustion gas exhausted from the gas turbine 10, and the control device 50a, 50c, 50d, or 50e. The gas turbine 10 includes the compressor 14 capable of compressing air to generate compressed air, the combustor 15 capable of burning fuel in the compressed air to generate a combustion gas, and the turbine 16 capable of being driven by the combustion gas. The combustor 15 includes the combustion chamber forming device 15c that forms the combustion chamber 15s in which the fuel is burned and which is capable of leading the combustion gas generated by combustion of the fuel to the turbine 16, and the combustor main body 15b capable of injecting ammonia as the fuel and the main combustion air Am, which is part of the compressed air, into the combustion chamber 15s. The combustion chamber forming device 15c is formed with the opening 15o through which the dilution air Al, which is part of the compressed air, is capable of being introduced into the combustion chamber 15s from outside the combustion chamber forming device 15c. The combustor 15 is configured such that the rich combustion area RA in which fuel from the combustor main body 15b is burned in a fuel-air ratio, which is a ratio of fuel to air, larger than a stoichiometric fuel-air ratio, and the lean combustion area LA in which a gas from the rich combustion area RA is diluted with the dilution air Al from the opening 15o and fuel contained in the gas after being diluted with the dilution air Al is burned in a fuel-air ratio smaller than the stoichiometric fuel-air ratio are formed in the combustion chamber 15s. The air return line 18p is configured to return part of the compressed air discharged from the compressor 14 back into the compressor 14. The return air regulating valve 18v is configured to be capable of regulating the flow rate of the return air Ab, which is the compressed air flowing through the air return line 18p. The control device 50a, 50c, 50d, or 50e includes the return air controller 54, 54c, 54d, or 54e that controls the return air regulating valve 18v such that the flow rate of the return air Ab is increased, according to NOx concentration in the exhaust gas which is the combustion gas that is exhausted from the turbine.

In this aspect, when the NOx concentration in the exhaust gas becomes equal to or higher than a predetermined value, the return air controller 54, 54c, 54d, or 54e controls the operation of the return air regulating valve 18v such that the flow rate of the return air Ab is increased. In the combustor 15 of this aspect that adopts the RQL method, when the flow rate of the return air Ab increases, both the fuel-air ratios in the rich combustion area RA and the lean combustion area LA increase. As a result, in this aspect, the emission amount of NOx can be suppressed.

(12) In gas turbine equipment in a twelfth aspect,
the gas turbine equipment in the eleventh aspect further includes the unburned content concentration meter 59 that detects unburned content concentration in the exhaust gas. The return air controller 54, 54c, 54d, or 54e controls the operation of the return air regulating valve 18v such that the NOx concentration in the exhaust gas becomes lower than a predetermined value and the unburned content concentration in the exhaust gas falls within a predetermined unburned content concentration range determined according to the NOx concentration.

In this aspect, it is possible to make the unburned content concentration in the exhaust gas be within a predetermined unburned content concentration range while suppressing the NOx concentration.

(13) In gas turbine equipment in a thirteenth aspect,
the gas turbine equipment in the eleventh or twelfth aspect further includes the dilution air regulating valve 17v that regulates the flow rate of the dilution air Al that is introduced into the combustion chamber 15s from the opening 15o. The control device 50d or 50e includes the dilution air controller 55d or 55e that controls the operation of the dilution air regulating valve 17v, and the cooperation controller 56d or 56e that causes the control of the return air regulating valve 18v by the return air controller 54d or 54e and the control of the dilution air regulating valve 17v by the dilution air controller 55d or 55e to cooperate with each other. The cooperation controller 56d or 56e causes the dilution air controller 55d or 55e to control the dilution air regulating valve 17v such that the flow rate of the dilution air Al is increased, according to the NOx concentration in the exhaust gas detected by the NOx concentration meter 58.

In this aspect, when the flow rate of the dilution air Al flowing into the combustion chamber 15s of the combustor 15 adopting the RQL method is increased with the control of the dilution air regulating valve 17v by the dilution air controller 55d or 55e, the flow rate of the main combustion air Am that is injected from the combustor main body 15b into the combustion chamber 15s is reduced. Therefore, in this aspect, when the NOx concentration in the exhaust gas becomes equal to or higher than a predetermined value, the fuel-air ratio in the lean combustion area LA is reduced, and the fuel-air ratio in the rich combustion area RA is increased. As a result, in this aspect, the emission amount of NOx can be suppressed.

(14) In gas turbine equipment in a fourteenth aspect,
in the gas turbine equipment in the thirteenth aspect, the cooperation controller 56d or 56e increases the flow rate of the dilution air Al via the control of the dilution air regulating valve 17v by the dilution air controller 55d or 55e while increasing the flow rate of the return air Ab via the control of the return air regulating valve 18v by the return air controller 54d or 54e such that a fuel-air ratio in the lean combustion area LA does not change and a fuel-air ratio in the rich combustion area RA is increased.

In the combustor 15 adopting the RQL method, when the fuel-air ratio in the lean combustion area LA becomes smaller than a predetermined value, the unburned content in the lean combustion area LA increases. In this aspect, since the fuel-air ratio in the lean combustion area LA does not change, it is possible to suppress an increase in the unburned content concentration in the exhaust gas.

(15) Gas turbine equipment in a fifteenth aspect includes
the gas turbine 10, the dilution air regulating valve 17v, and the control device 50b, 50d, or 50e. The gas turbine 10 includes the compressor 14 capable of compressing air to generate compressed air, the combustor 15 capable of burning ammonia as fuel in the compressed air to generate a combustion gas, and the turbine 16 capable of being driven by the combustion gas. The compressor 14 includes the compressor rotor 14r rotatable with the axis Ar as a center, and the compressor casing 14c that covers the compressor rotor 14r. The combustor 15 includes the combustion chamber forming device 15c that forms the combustion chamber 15s in which the fuel is burned and which is capable of leading the combustion gas generated by combustion of the fuel to the turbine 16, and the combustor main body 15b capable of injecting the ammonia and the main combustion air Am, which is part of the compressed air, into the combustion chamber 15s. The combustion chamber forming device 15c is formed with the opening 15o through which the dilution air Al, which is part of the compressed air, is capable of being introduced into the combustion chamber 15s from outside the combustion chamber forming device 15c. The combustor 15 is configured such that the rich combustion area RA in which fuel from the combustor main body 15b is burned in a fuel-air ratio, which is a ratio of fuel to air, larger than a stoichiometric fuel-air ratio, and the lean combustion area LA in which a gas from the rich combustion area PA is diluted with the dilution air Al from the opening 15o and fuel contained in the gas after being diluted with the dilution air Al is burned in a fuel-air ratio smaller than the stoichiometric fuel-air ratio are formed in the combustion chamber 15s. The dilution air regulating valve 17v is a valve capable of regulating the flow rate of the dilution air Al that is introduced into the combustion chamber 15s from the opening 15o. The control device 50b, 50d, or 50e includes the dilution air controller 55, 55d, or 55e that controls the dilution air regulating valve 17v such that the flow rate of the dilution air Al increases, according to the NOx concentration in the exhaust gas which is a combustion gas that is exhausted from the turbine.

In this aspect, when the flow rate of the dilution air Al flowing into the combustion chamber 15s of the combustor 15 that adopts the RQL method is increased with the control of the dilution air regulating valve 17v by the dilution air controller 55, 55d, or 55e, the flow rate of the main combustion air Am that is injected from the combustor main body 15b into the combustion chamber 15s is reduced. Therefore, in this aspect, when the NOx concentration in the exhaust gas becomes equal to or higher than a predetermined value, the fuel-air ratio in the lean combustion area LA is reduced, and the fuel-air ratio in the rich combustion area RA is increased. As a result, in this aspect, the emission amount of NOx can be suppressed.

(16) In gas turbine equipment in a sixteenth aspect,
the gas turbine equipment in the fifteenth aspect further includes the unburned content concentration meter 59 that detects the unburned content concentration in the exhaust gas. The dilution air controller 55, 55d, or 55e controls the dilution air regulating valve 17v such that the NOx concentration in the exhaust gas becomes lower than a predetermined value and the unburned content concentration in the exhaust gas falls within a predetermined unburned content concentration range determined according to the NOx concentration.

In this aspect, it is possible to make the unburned content concentration in the exhaust gas be within a predetermined unburned content concentration range while suppressing the NOx concentration.

The gas turbine control method in each of the embodiments described above is understood as follows, for example.

(17) A gas turbine control method in a seventeenth aspect
is applied to the following gas turbine.

The gas turbine 10 includes the compressor 14 capable of compressing air to generate compressed air, the combustor 15 capable of burning fuel in the compressed air to generate a combustion gas, and the turbine 16 capable of being driven by the combustion gas. The compressor 14 includes the compressor rotor 14r rotatable with the axis Ar as a center, and the compressor casing 14c that covers the compressor rotor 14r. The combustor 15 includes the combustion chamber forming device 15c that forms the combustion chamber 15s in which the fuel is burned and which is capable of leading the combustion gas generated by combustion of the fuel to the turbine, and the combustor main body 15b capable of injecting ammonia as the fuel and the main combustion air Am, which is part of the compressed air, into the combustion chamber 15s. The combustion chamber forming device 15c is formed with the opening 15o through which the dilution air Al, which is part of the compressed air, is capable of being introduced into the combustion chamber 15s from outside the combustion chamber forming device 15c.

The control method of this aspect includes: the combustion step S1 of injecting the ammonia as the fuel and the main combustion air Am from the combustor main body 15b into the combustion chamber 15s and introducing the dilution air Al into the combustion chamber 15s from the opening 15o to form, in the combustion chamber 15s, the rich combustion area RA in which fuel from the combustor main body 15b is burned in a fuel-air ratio, which is a ratio of fuel to air, larger than a stoichiometric fuel-air ratio, and the lean combustion area LA in which a gas from the rich combustion area RA is diluted with the dilution air Al from the opening 15o and fuel contained in the gas after being diluted with the dilution air Al is burned in a fuel-air ratio smaller than the stoichiometric fuel-air ratio; the NOx concentration detection step S2 of detecting the NOx concentration in the exhaust gas, which is a combustion gas generated by combustion of the fuel and exhausted from the gas turbine 10; and the intake air control step S4, S4c, S4d, or S4e of reducing an intake air amount, which is the flow rate of air that is sucked into the compressor casing 14c, according to the NOx concentration in the exhaust gas detected in the NOx concentration detection step S2.

In this aspect, as in the gas turbine equipment in the first aspect, the emission amount of NOx can be suppressed.

(18) In a gas turbine control method in an eighteenth aspect, the control method for the gas turbine 10 in the seventeenth aspect further includes the unburned content concentration detection step S3 of detecting the unburned content concentration in the exhaust gas. In the intake air control step S4, S4c, S4d, or S4e, the intake air amount is controlled such that the NOx concentration in the exhaust gas becomes lower than a predetermined value and the unburned content concentration falls within a predetermined unburned content concentration range determined according to the NOx concentration.

In this aspect, as in the gas turbine equipment in the second aspect, it is possible to make the unburned content concentration in the exhaust gas be within a predetermined unburned content concentration range while suppressing the NOx concentration.

(19) In a gas turbine control method in a nineteenth aspect, the control method for the gas turbine 10 in the seventeenth or eighteenth aspect further includes the return air control step S5c or S5e of increasing the flow rate that is returned to the compressor casing 14c with part of the compressed air discharged from the compressor casing 14c as the return air Ab according to the NOx concentration in the exhaust gas detected in the NOx concentration detection step S2, along with the intake air control step S4c or S4e.

In this aspect, as in the gas turbine equipment in the third aspect, the emission amount of NOx can be suppressed.

(20) In a gas turbine control method in a twentieth aspect, the control method for the gas turbine 10 in any one of the seventeenth to nineteenth aspects further includes the dilution air control step S6e of increasing the flow rate of the dilution air Al according to the NOx concentration in the exhaust gas detected in the NOx concentration detection step S2, along with the intake air control step S4e.

In this aspect, as in the gas turbine equipment in the seventh aspect, the emission amount of NOx can be suppressed.

(21) A gas turbine control method in a twenty-first aspect is applied to the following gas turbine.

The gas turbine 10 includes the compressor 14 capable of compressing air to generate compressed air, the combustor 15 capable of burning fuel in the compressed air to generate a combustion gas, and the turbine 16 capable of being driven by the combustion gas. The compressor 14 includes the compressor rotor 14r rotatable with the axis Ar as a center, and the compressor casing 14c that covers the compressor rotor 14r. The combustor 15 includes the combustion chamber forming device 15c that forms the combustion chamber 15s in which the fuel is burned and which is capable of leading the combustion gas generated by combustion of the fuel to the turbine 16, and the combustor main body 15b capable of injecting ammonia as the fuel and the main combustion air Am, which is part of the compressed air, into the combustion chamber 15s. The combustion chamber forming device 15c is formed with the opening 15o through which the dilution air Al, which is part of the compressed air, is capable of being introduced into the combustion chamber 15s from outside the combustion chamber forming device 15c.

The control method of this aspect includes: the combustion step S1 of injecting the ammonia as the fuel and the main combustion air Am from the combustor main body 15b into the combustion chamber 15s and introducing the dilution air Al into the combustion chamber 15s from the opening 15o to form, in the combustion chamber 15s, the rich combustion area RA in which fuel from the combustor main body 15b is burned in a fuel-air ratio, which is a ratio of fuel to air, larger than a stoichiometric fuel-air ratio, and the lean combustion area LA in which a gas from the rich combustion area RA is diluted with the dilution air Al from the opening 15o and fuel contained in the gas after being diluted with the dilution air Al is burned in a fuel-air ratio smaller than the stoichiometric fuel-air ratio; the NOx concentration detection step S2 of detecting the NOx concentration in the exhaust gas, which is a combustion gas generated by combustion of the fuel and exhausted from the gas turbine 10; and the return air control step S5, S5c, or S5e of increasing a flow rate that is returned into the compressor casing 14c with part of the compressed air discharged from the compressor casing 14c as the return air Ab according to the NOx concentration in the exhaust gas detected in the NOx concentration detection step S2.

In this aspect, as in the gas turbine equipment in the eleventh aspect, the emission amount of NOx can be suppressed.

(22) In a gas turbine control method in a twenty-second aspect, the control method for the gas turbine 10 in the twenty-first aspect further includes the unburned content concentration detection step S3 of detecting the unburned content concentration in the exhaust gas, in which in the return air control step S5, S5c, or S5e, the flow rate of the return air Ab is controlled such that the NOx concentration in the exhaust gas becomes lower than a predetermined value and the unburned content concentration falls within a predetermined unburned content concentration range determined according to the NOx concentration.

In this aspect, as in the gas turbine equipment in the twelfth aspect, it is possible to make the unburned content concentration in the exhaust gas be within a predetermined unburned content concentration range while suppressing the NOx concentration.

(23) In a gas turbine control method in a twenty-third aspect, the control method for the gas turbine 10 in the twenty-first or twenty-second aspect further includes the dilution air control step S6e of increasing the flow rate of the dilution air Al according to the NOx concentration in the exhaust gas detected in the NOx concentration detection step S2, along with the return air control step S5e.

In this aspect, as in the gas turbine equipment in the thirteenth aspect, the emission amount of NOx can be suppressed.

(24) A gas turbine control method in a twenty-fourth aspect is applied to the following gas turbine.

The gas turbine 10 includes the compressor 14 capable of compressing air to generate compressed air, the combustor 15 capable of burning fuel in the compressed air to generate a combustion gas, and the turbine 16 capable of being driven by the combustion gas. The compressor 14 includes the compressor rotor 14r rotatable with the axis Ar as a center, and the compressor casing 14c that covers the compressor rotor 14r. The combustor 15 includes the combustion chamber forming device 15c that forms the combustion chamber 15s in which the fuel is burned and which is capable of leading the combustion gas generated by combustion of the fuel to the turbine 16, and the combustor main body 15b capable of injecting ammonia as the fuel and the main combustion air Am, which is part of the compressed air, into the combustion chamber 15s. The combustion chamber forming device 15c is formed with the opening 15o through which the dilution air Al, which is part of the compressed air, is capable of being introduced into the combustion chamber 15s from outside the combustion chamber forming device 15c.

The control method of this aspect includes the combustion step S1 of injecting the ammonia as the fuel and the main combustion air Am from the combustor main body 15b into the combustion chamber 15s and introducing the dilution air Al into the combustion chamber 15s from the opening 15o to form, in the combustion chamber 15s, the rich combustion area RA in which fuel from the combustor main body 15b is burned in a fuel-air ratio, which is a ratio of fuel to air, larger than a stoichiometric fuel-air ratio, and the lean combustion area LA in which a gas from the rich combustion area RA is diluted with the dilution air Al from the opening 15o and fuel contained in the gas after being diluted with the dilution air Al is burned in a fuel-air ratio smaller than the stoichiometric fuel-air ratio; the NOx concentration detection step S2 of detecting the NOx concentration in the exhaust gas, which is a combustion gas generated by combustion of the fuel and exhausted from the gas turbine 10; and the dilution air control step S6, S6d, or S6e of increasing the flow rate of the dilution air Al according to the NOx concentration in the exhaust gas detected in the NOx concentration detection step S2.

In this aspect, as in the gas turbine equipment in the fifteenth aspect, the emission amount of NOx can be suppressed.

INDUSTRIAL APPLICABILITY

In an aspect of the present disclosure, in a case where ammonia is used as fuel for a gas turbine, the emission amount of NOx can be reduced.

REFERENCE SIGNS LIST

10: gas turbine
11: gas turbine rotor
12: intake duct
13: intermediate casing
14: compressor
14r: compressor rotor
14c: compressor casing
14v: intake air adjuster (or IGV)
15: combustor
15b: combustor main body
15c: combustion chamber forming device
15o: opening
15s: combustion chamber
16: turbine
16r: turbine rotor
16c: turbine casing
17: dilution air regulating device
17p: dilution air line
17v: dilution air regulating valve
17vb: valve body
17vc: valve casing
18: compressed air return device
18p: air return line
18v: return air regulating valve
16: turbine
16r: turbine rotor
16c: turbine casing
20: fuel supply equipment
21: ammonia tank
22: liquid ammonia line
23: ammonia pump
24: fuel regulating valve
25: vaporizer
26: gaseous ammonia line
28: denitration device
29: chimney
50, 50a, 50b, 50c, 50d, 50e: control device
51: fuel flow rate calculator
52: fuel controller
53, 53a, 53c, 53d, 53e: intake air controller
54, 54c, 54d, 54e: return air controller
55, 55d, 55e: dilution air controller
56, 56d, 56e: cooperation controller
58: NOx concentration meter
59: unburned content concentration meter
LA: lean combustion area
RA: rich combustion area
QA: quench area
Ab: return air
Al: dilution air
Am: main combustion air

The invention claimed is:

1. Gas turbine equipment comprising:
a gas turbine;
a NOx concentration meter that detects NOx concentration in an exhaust gas which is a combustion gas exhausted from the gas turbine; and
a control device,
wherein the gas turbine includes a compressor capable of compressing air to generate compressed air, a combustor capable of burning ammonia as fuel in the compressed air to generate a combustion gas, and a turbine capable of being driven by the combustion gas,
the compressor includes a compressor rotor rotatable with an axis as a center, a compressor casing that covers the compressor rotor, and an intake air adjuster that adjusts an intake air amount that is a flow rate of air that is sucked into the compressor casing, the combustor includes a combustion chamber forming device that forms a combustion chamber in which the fuel is burned and which is capable of leading the combustion gas generated by combustion of the fuel to the turbine, and a combustor main body capable of injecting the ammonia and main combustion air, which is part of the compressed air, into the combustion chamber, the combustion chamber forming device is formed with an opening through which dilution air, which is part of the compressed air, is capable of being introduced into the combustion chamber from outside the combustion chamber forming device, the combustor is configured such that a rich combustion area in which fuel from the combustor main body is burned in a fuel-air ratio, which is a ratio of fuel to air, larger than a stoichiometric fuel-air ratio, and a lean combustion area in which a gas from the rich combustion area is diluted with the dilution air from the opening and fuel contained in the gas after being diluted with the dilution air is burned in a fuel-air ratio smaller than the stoichiometric fuel-air ratio are formed in the combustion chamber, and the control device includes an intake air controller configured to control an operation of the intake air adjuster such that the intake air amount is reduced, according to the NOx concentration in the exhaust gas detected by the NOx concentration meter.

2. The gas turbine equipment according to claim 1, further comprising:

an unburned content concentration meter configured to detect unburned content concentration in the exhaust gas, wherein the intake air controller is configured to control an operation of the intake air adjuster such that the NOx concentration in the exhaust gas becomes lower than a predetermined value and the unburned content concentration in the exhaust gas falls within a predetermined unburned content concentration range determined according to the NOx concentration.

3. The gas turbine equipment according to claim 2, further comprising:

an air return line capable of returning part of the compressed air discharged from the compressor casing back into the compressor casing; and a return air regulating valve capable of regulating a flow rate of return air, which is the compressed air flowing through the air return line, wherein the control device includes a return air controller configured to control an operation of the return air regulating valve, and a cooperation controller configured to control the intake air adjuster by the intake air controller and control of the return air regulating valve by the return air controller to cooperate with each other, and the cooperation controller is configured to cause the intake air controller to control the intake air adjuster and the return air controller to control the return air regulating valve such that the NOx concentration in the exhaust gas becomes lower than a predetermined value and the unburned content concentration in the exhaust gas falls within a predetermined unburned content concentration range determined according to the NOx concentration.

4. The gas turbine equipment according to claim 3, wherein the cooperation controller is configured to cause the return air controller to regulate a flow rate of the return air such that the return air by the return air regulating valve is increased, in any one of a first case, a second case, and a third case, after causing the intake air controller to control the intake air adjuster such that the NOx concentration in the exhaust gas becomes lower than the predetermined value, the first case being where the unburned content concentration in the exhaust gas does not fall within the unburned content concentration range, the second case comprises receiving a request to further reduce the unburned content concentration in the exhaust gas, and the third case being where a fuel-air ratio is not increased by a predetermined amount only by an operation of the intake air adjuster.

5. The gas turbine equipment according to claim 1, further comprising:

an air return line capable of returning part of the compressed air discharged from the compressor casing back into the compressor casing; and a return air regulating valve capable of regulating a flow rate of return air, which is the compressed air flowing through the air return line, wherein the control device includes a return air controller configured to control an operation of the return air regulating valve, and a cooperation controller configured to control the intake air adjuster by the intake air controller and control of the return air regulating valve by the return air controller to cooperate with each other, and the cooperation controller causes the return air controller to control the return air regulating valve such that a flow rate of the return air is increased, according to the NOx concentration in the exhaust gas detected by the NOx concentration meter.

6. The gas turbine equipment according to claim 5, wherein the cooperation controller is configured to cause the intake air controller to control the intake air adjuster and the return air controller to control the return air regulating valve such that a ratio between the amount of change in fuel-air ratio in regulation of the intake air amount by the intake air adjuster and the amount of change in fuel-air ratio in regulation of a flow rate of the return air by the return air regulating valve becomes a predetermined ratio.

7. The gas turbine equipment according to claim 5, further comprising:

a dilution air regulating valve configured to regulate a flow rate of the dilution air that is introduced into the combustion chamber from the opening, wherein the control device includes a dilution air controller configured to control an operation of the dilution air regulating valve, the cooperation controller is configured to control the intake air adjuster by the intake air controller, control of the return air regulating valve by the return air controller, and control of the dilution air regulating valve by the dilution air controller to cooperate with each other, and the cooperation controller is configured to cause the dilution air controller to control the dilution air regulating valve such that a flow rate of the dilution air is increased, according to the NOx concentration in the exhaust gas detected by the NOx concentration meter.

8. The gas turbine equipment according to claim 7, wherein the cooperation controller is configured to cause the intake air controller, the return air controller, and the dilution air controller to reduce the intake air amount by the intake air adjuster, increase a flow rate of the return air by the return air regulating valve, and increase a flow rate of the dilution air by the dilution air regulating valve, such that a fuel-air ratio in the lean combustion area does not change and a fuel-air ratio in the rich combustion area is increased.

9. The gas turbine equipment according to claim 1, further comprising:
a dilution air regulating valve configured to regulate a flow rate of the dilution air that is introduced into the combustion chamber from the opening,
wherein the control device includes a dilution air controller configured to control an operation of the dilution air regulating valve, and a cooperation controller configured to control the intake air adjuster by the intake air controller and control of the dilution air regulating valve by the dilution air controller to cooperate with each other, and
the cooperation controller is configured to cause the dilution air controller to control the dilution air regulating valve such that a flow rate of the dilution air is increased, according to the NOx concentration in the exhaust gas detected by the NOx concentration meter.

10. The gas turbine equipment according to claim 9, wherein the cooperation controller is configured to increase a flow rate of the dilution air via control of the dilution air regulating valve by the dilution air controller while reducing the intake air amount via control of the intake air adjuster by the intake air controller such that a fuel-air ratio in the lean combustion area does not change and a fuel-air ratio in the rich combustion area is increased.

11. Gas turbine equipment comprising:
a gas turbine;
an air return line;
a return air regulating valve;
a NOx concentration meter that detects NOx concentration in an exhaust gas which is a combustion gas exhausted from the gas turbine; and
a control device,
wherein the gas turbine includes a compressor capable of compressing air to generate compressed air, a combustor capable of burning fuel in the compressed air to generate a combustion gas, and a turbine capable of being driven by the combustion gas,
the combustor includes a combustion chamber forming device that forms a combustion chamber in which the fuel is burned and which is capable of leading the combustion gas generated by combustion of the fuel to the turbine, and a combustor main body capable of injecting ammonia as the fuel and main combustion air, which is part of the compressed air, into the combustion chamber,
the combustion chamber forming device is formed with an opening through which dilution air, which is part of the compressed air, is capable of being introduced into the combustion chamber from outside the combustion chamber forming device,
the combustor is configured such that a rich combustion area in which fuel from the combustor main body is burned in a fuel-air ratio, which is a ratio of fuel to air, larger than a stoichiometric fuel-air ratio, and a lean combustion area in which a gas from the rich combustion area is diluted with the dilution air from the opening and fuel contained in the gas after being diluted with the dilution air is burned in a fuel-air ratio smaller than the stoichiometric fuel-air ratio are formed in the combustion chamber,
the air return line is configured to return part of the compressed air discharged from the compressor back into the compressor,
the return air regulating valve is configured to be capable of regulating a flow rate of return air, which is the compressed air flowing through the air return line, and
the control device includes a return air controller configured to control the return air regulating valve such that a flow rate of the return air is increased, according to NOx concentration in an exhaust gas which is a combustion gas that is exhausted from the turbine.

12. The gas turbine equipment according to claim 11, further comprising:
an unburned content concentration meter configured to detect unburned content concentration in the exhaust gas,
wherein the return air controller is configured to control an operation of the return air regulating valve such that NOx concentration in the exhaust gas becomes lower than a predetermined value and unburned content concentration in the exhaust gas falls within a predetermined unburned content concentration range determined according to the NOx concentration.

13. The gas turbine equipment according to claim 11, further comprising:
a dilution air regulating valve configured to regulate a flow rate of the dilution air that is introduced into the combustion chamber from the opening,
wherein the control device includes a dilution air controller configured to control an operation of the dilution air regulating valve, and a cooperation controller configured to control the return air regulating valve by the return air controller and control of the dilution air regulating valve by the dilution air controller to cooperate with each other, and
the cooperation controller is configured to control the dilution air controller to control the dilution air regulating valve such that a flow rate of the dilution air is increased, according to the NOx concentration in the exhaust gas detected by the NOx concentration meter.

14. The gas turbine equipment according to claim 13, wherein the cooperation controller is configured to increase a flow rate of the dilution air via control of the dilution air regulating valve by the dilution air controller while increasing a flow rate of the return air via control of the return air regulating valve by the return air controller such that a fuel-air ratio in the lean combustion area does not change and a fuel-air ratio in the rich combustion area is increased.

15. Gas turbine equipment comprising:
a gas turbine;
a dilution air regulating valve; and
a control device,
wherein the gas turbine includes a compressor capable of compressing air to generate compressed air, a combustor capable of burning ammonia as fuel in the compressed air to generate a combustion gas, and a turbine capable of being driven by the combustion gas,
the compressor includes a compressor rotor rotatable with an axis as a center, and a compressor casing that covers the compressor rotor,
the combustor includes a combustion chamber forming device that forms a combustion chamber in which the fuel is burned and which is capable of leading the combustion gas generated by combustion of the fuel to the turbine, and a combustor main body capable of injecting the ammonia and main combustion air, which is part of the compressed air, into the combustion chamber, the combustion chamber forming device is formed with an opening through which dilution air, which is part of the compressed air, is capable of being introduced into the combustion chamber from outside the combustion chamber forming device, the combustor is configured such that a rich combustion area in which fuel from the combustor main body is burned in a fuel-air ratio, which is a ratio of fuel to air, larger than a stoichiometric fuel-air ratio, and a lean combustion area in which a gas from the rich combustion area is diluted with the dilution air from the opening and fuel contained in the gas after being diluted with the dilution air is burned in a fuel-air ratio smaller than the stoichiometric fuel-air ratio are formed in the combustion chamber, the dilution air regulating valve is capable of regulating a flow rate of the dilution air that is introduced into the combustion chamber from the opening, and the control device includes a dilution air controller configured to control the dilution air regulating valve such that a flow rate of the dilution air increases, according to NOx concentration in an exhaust gas which is a combustion gas that is exhausted from the turbine.

16. The gas turbine equipment according to claim 15, further comprising:

an unburned content concentration meter that detects unburned content concentration in the exhaust gas, wherein the dilution air controller is configured to control the dilution air regulating valve such that NOx concentration in the exhaust gas becomes lower than a predetermined value and unburned content concentration in the exhaust gas falls within a predetermined unburned content concentration range determined according to the NOx concentration.

* * * * *